(12) United States Patent
Okamoto et al.

(10) Patent No.: US 11,795,350 B2
(45) Date of Patent: Oct. 24, 2023

(54) OPTICAL PRESSURE-SENSITIVE ADHESIVE COMPOSITION AND USE THEREOF

(71) Applicant: NITTO DENKO CORPORATION, Ibaraki (JP)

(72) Inventors: Masayuki Okamoto, Ibaraki (JP); Naofumi Kosaka, Ibaraki (JP); Satoshi Honda, Ibaraki (JP); Yosuke Shimizu, Ibaraki (JP); Ryoko Asai, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 239 days.

(21) Appl. No.: 17/262,584

(22) PCT Filed: Jul. 29, 2019

(86) PCT No.: PCT/JP2019/029611
§ 371 (c)(1),
(2) Date: Jan. 22, 2021

(87) PCT Pub. No.: WO2020/027033
PCT Pub. Date: Feb. 6, 2020

(65) Prior Publication Data
US 2021/0348036 A1    Nov. 11, 2021

(30) Foreign Application Priority Data
Jul. 31, 2018    (JP) .................. 2018-143420

(51) Int. Cl.
*C09J 7/38* (2018.01)
*C09J 7/10* (2018.01)

(52) U.S. Cl.
CPC .............. *C09J 7/385* (2018.01); *C09J 7/10* (2018.01); *C09J 2301/302* (2020.08); *C09J 2301/408* (2020.08); *C09J 2433/00* (2013.01)

(58) Field of Classification Search
CPC ........ C09J 7/385; C09J 133/00; C09J 133/04; C09J 133/06; C09J 133/062;
(Continued)

(56) References Cited

U.S. PATENT DOCUMENTS

| | | |
|---|---|---|
| 2012/0213991 A1 | 8/2012 | Inui et al. |
| 2013/0123417 A1 | 5/2013 | Takarada et al. |

(Continued)

FOREIGN PATENT DOCUMENTS

| | | |
|---|---|---|
| CN | 102575133 A | 7/2012 |
| CN | 103102815 A | 5/2013 |

(Continued)

OTHER PUBLICATIONS

English translation of International Preliminary Report on Patentability issued for corresponding International Patent Application No. PCT/JP2019/029611 dated Feb. 11, 2021.
(Continued)

*Primary Examiner* — Zachary M Davis
(74) *Attorney, Agent, or Firm* — HAUPTMAN HAM, LLP

(57) ABSTRACT

Provided is an optical PSA composition that can be easily peeled using an aqueous liquid such as water and has sufficient adhesive strength. An optical PSA composition comprising an acrylic polymer is provided. The PSA composition comprises at least one species of compound A selected among surfactants and compounds having polyoxyalkylene backbones. The monomers forming the acrylic polymer comprises less than 20 wt % alkoxyalkyl (meth) acrylate and less than 20 wt % alkoxypolyalkylene glycol (meth)acrylate. Alternatively, the compound A content is less than 1 part by weight to 100 parts by weight of the acrylic polymer.

19 Claims, 1 Drawing Sheet

(58) Field of Classification Search
CPC .............. C09J 133/064; C09J 133/066; C09J 133/068; C09J 133/08; C09J 133/10; C09J 133/12; C09J 133/14; C09J 133/18; C09J 133/20; C09J 133/22; C09J 133/24; C09J 133/26

See application file for complete search history.

(56) References Cited

U.S. PATENT DOCUMENTS

| | | | |
|---|---|---|---|
| 2014/0302314 A1* | 10/2014 | Takashima | ............. C09J 133/08 524/106 |
| 2021/0214587 A1 | 7/2021 | Kosaka et al. | |

FOREIGN PATENT DOCUMENTS

| | | | | |
|---|---|---|---|---|
| CN | 111670234 A | 9/2020 | | |
| EP | 2810998 A1 * | 12/2014 | .............. | C08L 33/04 |
| EP | 3 750 962 A1 | 12/2020 | | |
| JP | 2009-516048 A | 4/2009 | | |
| JP | 2009-519372 A | 5/2009 | | |
| JP | 2012-38827 A | 2/2012 | | |
| JP | 2013-47295 A | 3/2013 | | |
| JP | 2013-159662 A | 8/2013 | | |
| JP | 2013-216738 A | 10/2013 | | |
| JP | 2 810 998 A1 | 12/2014 | | |
| JP | 2015-199891 A | 11/2015 | | |
| JP | 2015-227394 A | 12/2015 | | |
| JP | 2017-52887 A | 3/2017 | | |
| WO | 2007/058493 A1 | 5/2007 | | |
| WO | 2007/069856 A1 | 6/2007 | | |

OTHER PUBLICATIONS

Office Action dated Feb. 23, 2022, for corresponding Chinese patent application No. 201980050958.2, along with an English machine translation.

Extended European Search Report dated May 3, 2022, for corresponding European Patent Application No. 19845058.7.

International Search Report issued for corresponding International Patent Application No. PCT/JP2019/029611 dated Oct. 8, 2019, along with an English translation.

Written Opinion issued for corresponding International Patent Application No. PCT/JP2019/029611 dated Oct. 8, 2019.

Office Action dated Jan. 10, 2023 for corresponding Taiwanese Patent Application No. 108127164, along with an English translation (19 pages).

Office Action dated Feb. 24, 2023 for corresponding Japanese Patent Application No. 2019-138604, along with an English machine translation (10 pages).

Information Sheet issued on May 2, 2023 for corresponding Japanese Patent Application No. 2019-138604, along with an English translation (6 pages).

Third Party Observation dated Jun. 21, 2023 issued for corresponding Taiwanese Patent Application No. 108127164, along with an English translation (21 pages).

Office Action dated Jul. 20, 2023 issued for corresponding Japanese Patent Application No. 2019-138604, along with an English machine translation (4 pages).

Office Action dated Aug. 9, 2023 for corresponding Vietnamese Patent Application No. 1-2021-00963, along with an English translation (4 pages).

* cited by examiner

OPTICAL PRESSURE-SENSITIVE ADHESIVE COMPOSITION AND USE THEREOF

CROSS REFERENCE TO RELATED APPLICATION

This application is a National Stage of International Application No. PCT/JP2019/029611, filed on Jul. 29, 2019, which designates the United States and was published in Japan, and which claims priority to Japanese Patent Application No. 2018-143420, filed on Jul. 31, 2018 in the Japan Patent Office. All of the aforementioned applications are hereby incorporated by reference in their entireties.

TECHNICAL FIELD

The present invention relates to an optical pressure-sensitive adhesive composition, a pressure-sensitive adhesive sheet, a pressure-sensitive adhesive sheet-bearing optical member and a method for peeling a pressure-sensitive adhesive sheet.

BACKGROUND ART

In general, pressure-sensitive adhesive (PSA) exists as a soft solid (a viscoelastic material) in a room temperature range and has a property to adhere easily to an adherend with some pressure applied. For such a property, PSA has been widely used in various fields as an on-support PSA sheet having a PSA layer on a support or as a support-less PSA sheet free of a support. PSA has been used to bond optical members such as polarizing plates in various optical applications including optical input devices such as touch panels and display devices such as liquid crystal displays. Technical literatures related to this type of PSA include Patent Documents 1 to 3. Patent Document 1 teaches PSA used in touch panels. Patent Documents 2 and 3 describes conventional art related to PSA for use in polarizing plates.

CITATION LIST

Patent Literature

[Patent Document 1] Japanese Patent Application Publication No. 2013-047295
[Patent Document 2] Japanese Patent Application Publication No. 2009-516048
[Patent Document 3] Japanese Patent Application Publication No. 2009-519372

SUMMARY OF INVENTION

Technical Problem

Various properties are required of PSA depending on the purposes. Among these properties, some are difficult to simultaneously achieve at a high level such that in improving a certain property, some other property has a tendency to decrease. One example of a set of properties in a trade-off relationship is adhesive strength to adherend and ease of rework. The term "rework" refers to, for instance, the work of removing a PSA sheet from its adherend and re-applying the sheet in case of inadequate application (improper placement, wrinkling, bubble formation, trapping of foreign material, etc.), in case of finding a defect in the adherend after the PSA sheet is applied. In particular, when the adherend is fragile or thin, to prevent the adherend from damage and deformation caused by reworking, it is necessary to reduce the peel strength (i.e. the adhesive strength to the adherend) of the PSA sheet relative to the adherend. Thus, it is not facile to bring about a PSA sheet that combines good reworkability and high adhesive strength.

For instance, in addition to the combination of reworkability and adhesive strength, optical applications require properties that are not damaging to the adherend's optical properties such as transparency; and therefore, PSA designs are even more strictly limited. For instance, with respect to a composition using an acrylic polymer in which alkoxyalkyl (meth)acrylate or alkoxypolyalkylene glycol (meth)acrylate is copolymerized to at least a certain percentage, Patent Document 1 is engaged in improvement of optical properties such as anti-thermal-clouding properties and anti-thermal-foaming properties.

The present invention has been made in view of these circumstances with an objective to provide a PSA sheet that allows easy peeling with an aqueous liquid such as water as well as an optical PSA composition (PSA composition for optical applications) having sufficient adhesive strength. Other related objectives of this invention include providing, a PSA sheet, an optical member having a PSA sheet, and a method for peeling a PSA sheet.

Solution to Problem

This description provides an optical PSA composition comprising an acrylic polymer. In the PSA composition according to an embodiment, the acrylic polymer is formed from monomers comprising less than 20% (by weight) alkoxyalkyl (meth)acrylate and less than 20% (by weight) alkoxypolyalkylene glycol (meth)acrylate. The PSA composition further comprises at least one species of compound A selected among surfactants and compounds having polyoxyalkylene backbones.

The PSA composition can provide good adhesive strength with the use of acrylic polymer. As for the acrylic polymer, from the standpoint of inhibiting gelation in producing the polymer, a species in which alkoxyalkyl (meth)acrylate and alkoxypolyalkylene glycol (meth)acrylate are used in limited amounts is used. In addition to the acrylic polymer, with the inclusion of at least one species of compound A selected among surfactants and polyoxyalkylene backbone-containing compounds, an aqueous liquid such as water can be used to effectively reduce the peel strength. In other words, in a composition suited for optical applications, sufficient adhesive strength can be combined with water-peeling properties which lead to reworkability.

This description provides an optical PSA composition according to another embodiment. This composition comprises an acrylic polymer and at least one species of compound A selected among surfactants and polyoxyalkylene backbone-containing compounds. The compound A content is less than 1 part by weight to 100 parts by weight of the acrylic polymer.

With the use of acrylic polymer, the PSA composition can provide good adhesive strength. In addition to the acrylic polymer, with the inclusion of the compound A, an aqueous liquid such as water can be used to reduce the peel strength. In other words, sufficient adhesive strength can be combined with water-peeling properties which lead to reworkability. Because of the limited usage of compound A, transparency required for optical applications is easily obtained and reduction of adhesive strength can be inhibited as well.

The PSA composition according to a preferable embodiment of the art disclosed herein (including an optical PSA composition, a PSA sheet, a PSA sheet-bearing optical member and a method for peeling a PSA sheet; the same applies, hereinafter) is a solvent-based PSA composition or a solvent-free PSA composition. In an embodiment using a solvent-based or solvent-free PSA, the effect of the art disclosed herein can be preferably obtained.

In a preferable embodiment of the art disclosed herein, the compound A is a nonionic surfactant. With the nonionic surfactant content in the acrylic polymer-containing PSA layer, water-peeling properties are preferably expressed. The use of nonionic surfactant as the compound A helps maintain low haze.

In a preferable embodiment of the art disclosed herein, the compound A has an HLB (hydrophile-lipophile balance) of 10 or higher. Water-peeling properties can be preferably expressed when using a compound (typically a surfactant) having an HLB of 10 or higher as the compound A.

In a preferable embodiment of the art disclosed herein, the monomers forming the acrylic polymer comprises an alkyl (meth)acrylate having an alkyl group with 1 to 20 carbon atoms at the ester terminus, and a monomer having a nitrogen atom (N). The use of an acrylic polymer having such a monomer composition can preferably bring about optical properties and good adhesive strength. In an embodiment using the acrylic polymer, the water-peeling properties by the compound A are readily obtained. The N-containing monomer is preferably one, two or more species of monomers selected from the group consisting of cyclic N-vinyl amides represented by the formula (1) and (meth)acrylamides:

[Chem 1]

(1)

(In the general formula (1), $R^1$ is a divalent organic group)

In a preferable embodiment of the art disclosed herein, the acrylic polymer has an SP value (solubility parameter) of 18.0 $(MJ/m^3)^{1/2}$ to 23.0 $(MJ/m^3)^{1/2}$. With the compound A content in the PSA comprising an acrylic polymer having such an SP value, the effect of the art disclosed herein is preferably obtained.

The PSA composition according to a preferable embodiment of the art disclosed herein further comprises a peel strength enhancer. With the inclusion of peel strength enhancer, the peel strength (adhesive strength) can be increased. In a more preferable embodiment, the peel strength enhancer is a compound having an alkoxysilyl group. With the use of the alkoxysilyl group-containing compound as the peel strength enhancer, the peel strength on the adherend can be effectively increased.

This description also provides an optical PSA sheet having a PSA layer formed from a PSA composition disclosed herein. According to this PSA sheet, good adhesive strength can be combined with water-peeling properties which lead to reworkability.

This description also provides a PSA sheet having a PSA layer. The PSA sheet has a normal peel strength FN1 of 2 N/cm or greater, determined at a tensile speed of 60 mm/min at a peel angle of 180° after the adhesive face of the PSA sheet is applied to an alkaline glass plate as the adherend and the resultant is left standing at 23° C. for 30 minutes. It also has a water-peel adhesive strength reduction rate A of 50% or higher. Here, the water-peel adhesive strength reduction rate A is determined by the next formula $(1-(FW1/FN1))\times 100$ from the normal peel strength FN1 (N/cm) and its water-peel strength FW1 (N/cm) determined at a tensile speed of 60 mm/min at a peel angle of 180°, using a tensile tester based on JIS Z0237 after the following procedures: in an environment at 23° C. and 50% RH, the adhesive face of the PSA sheet is applied to an alkaline glass plate as the adherend; after 30 minutes, 10 μL to 40 μL of distilled water is dropped onto the adherend; and the water is allowed to enter an interfacial edge between the PSA layer and the adherend.

According to this PSA sheet, good adhesive strength can be combined with water-peeling properties which lead to reworkability. In particular, the normal peel strength FN1 and water-peel strength FW1 are determined by the methods described later in Examples.

This description provides a PSA sheet having a PSA layer. The PSA sheet has an adhesive strength (normal adhesive strength) N0 of 2.0 N/10 mm or greater after one day at room temperature following application of the adhesive face to a surface of an alkaline glass plate as an adherend fabricated by a float method (or an alkaline float glass plate adherend, hereinafter), with the surface of the adherend having a contact angle of 5° to 10° with distilled water. The PSA sheet has a water-peel adhesive strength reduction rate B of 40% or higher. Here, the water-peel adhesive strength reduction rate B is determined by the next formula $(1-(N2/N0))\times 100$ based on the adhesive strength (normal adhesive strength) N0 (N/10 mm) and its water-peel strength N2 (N/10 mm) determined specifically at a test temperature of 23° C. at a tensile speed of 300 mm/min at a peel angle of 180° using a tensile tester according to JIS Z0237:2009 "10.4.1 Method 1: 180° Peel Strength to Test Plate" after the adhesive face is applied to the surface of the alkaline float glass plate adherend having a contact angle of 5° to 10° with distilled water, stored at room temperature for one day, 20 μL of distilled water is dropped onto the adherend and the distilled water is allowed to enter an interfacial edge between the PSA layer and the adherend. According to this PSA sheet, good adhesive strength can be combined with water-peeling properties which lead to reworkability. In particular, the normal peel strength N0 and water-peel strength N2 are determined by the methods described later in Examples.

The PSA layer may have a thickness of, for instance, 10 μm or greater and 200 μm or less. With the PSA layer having such a thickness, preferable adhesive strength can be obtained in optical applications.

This description also provides a PSA sheet-bearing optical member that comprises a PSA sheet disclosed herein and an optical member bonded to one face of the PSA sheet. For instance, the PSA sheet-bearing optical member may show good reworkability when adhering the PSA sheet to the optical member. For instance, when a defect such as trapping of foreign matter occurs during the application, using an aqueous liquid such as water, the PSA sheet can be easily peeled from the optical member and re-applied. When bonded with the PSA sheet, the PSA sheet-bearing optical member may have sufficient bonding reliability.

This description further provides a method for peeling a PSA sheet adhered on an adherend from the adherend. The method may include a water-peel step in which the PSA sheet is peeled from the adherend, in a state where an aqueous liquid exits at the interface between the adherend and the PSA sheet at the peel front line where the PSA sheet is being peeled from the adherend, with the aqueous liquid allowed to further enter the interface following the movement of the peel front line. Here, the peel front line refers to where the PSA sheet starts to separate from the adherend when peeling of the PSA sheet from the adherend is allowed to proceed. According to the water peel step, the PSA sheet can be peeled from the adherend with effective use of the aqueous liquid. The PSA sheet peeled by applying the peeling method disclosed herein typically includes a PSA layer. The PSA sheet can be, for instance, any PSA sheet disclosed herein.

The scope of the invention for which the present patent application seeks patent protection includes a suitable combination of the respective features described above.

DESCRIPTION OF EMBODIMENTS

Figure 1:
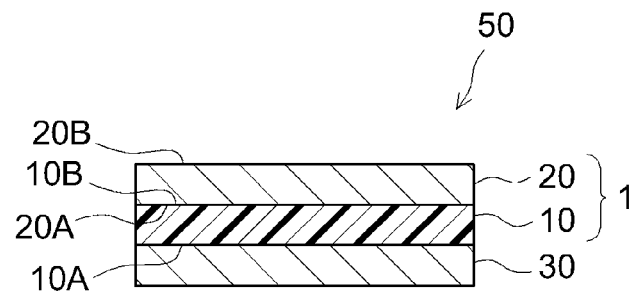
FIG. 1 shows a cross-sectional diagram schematically illustrating the PSA sheet according to an embodiment.

Preferable embodiments of the present invention are described below. Matters necessary to practice this invention other than those specifically referred to in this Description can be understood by a person skilled in the art based on the disclosure about implementing the invention in this Description and common technical knowledge at the time the application was filed. The present invention can be practiced based on the contents disclosed in this Description and common technical knowledge in the subject field. In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

As used herein, the term "acrylic polymer" refers to a polymer derived from a starting monomer mixture including more than 50% acrylic monomer by weight, or an acrylic polymer. The acrylic monomer refers to a monomer having at least one (meth)acryloyl group per molecule. As used herein, the term "(meth)acryloyl" comprehensively refers to acryloyl and methacryloyl. Similarly, the term "(meth)acrylate" comprehensively refers to acrylate and methacrylate, and the term "(meth)acryl" comprehensively refers to acryl and methacryl.

<PSA Composition>

The PSA composition disclosed herein comprises an acrylic polymer. In typical, the PSA composition can be an acrylic PSA composition whose primary component is an acrylic polymer. An acrylic PSA composition is highly transparent and preferably used for optical applications.

As for the PSA composition disclosed herein, for instance, a preferable acrylic PSA comprises, as the base polymer, an acrylic polymer formed from monomers including at least 40% (by weight) alkyl (meth)acrylate having a linear or branched alkyl group with 1 up to 20 carbon atoms at the ester terminus. Hereinafter, an alkyl (meth)acrylate having, at the ester terminus, an alkyl group with X up to Y number of carbon atoms may be referred to as an "$C_{X-Y}$ alkyl (meth)acrylate." For easy balancing of properties, the ratio of $C_{1-20}$ alkyl (meth)acrylate in the entire monomers (all monomers) of the acrylic polymer according to an embodiment is suitably above 50% by weight; and it can be, for instance, 55% by weight or higher, 60% by weight or higher, or even 70% by weight or higher. For the same reason, of the entire monomers, the ratio of $C_{1-20}$ alkyl (meth)acrylate can be, for instance, 99.9% by weight or less, 99.5% by weight or less, or even 99% by weight or less. The ratio of $C_{1-20}$ alkyl (meth)acrylate in all monomers of the acrylic polymer according to another embodiment can be, for instance, 98% by weight or lower. From the standpoint of increasing the cohesion of the PSA layer, it can be 95% by weight or lower, 85% by weight or lower (e.g. below 80% by weight), 70% by weight or lower, or even 60% by weight or lower.

Non-limiting specific examples of the $C_{1-20}$ alkyl (meth)acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, nonadecyl (meth)acrylate, and eicosyl (meth)acrylate.

Among these, it is preferable to use at least a $C_{4-20}$ alkyl (meth)acrylate and it is more preferable to use at least a $C_{4-18}$ alkyl (meth)acrylate. For example, as the monomer(s), one or each of n-butyl acrylate (BA) and 2-ethylhexyl acrylate (2EHA) is preferably included. An acrylic PSA including at least 2EHA is particularly preferable. Other examples of $C_{4-20}$ alkyl (meth)acrylates that are preferably used include isononyl acrylate, n-butyl methacrylate (BMA), 2-ethylhexyl methacrylate (2EHMA), and isostearyl acrylate (iSTA).

In some embodiments, the monomers forming the acrylic polymer may include 40% (by weight) or more $C_{4-18}$ alkyl (meth)acrylate. The ratio of $C_{4-18}$ alkyl (meth)acrylate in the monomers can be, for instance, 50% by weight or higher, 60% by weight or higher, or even 65% by weight or higher. The monomers may include a $C_{6-18}$ alkyl (meth)acrylate up to an aforementioned minimum value (percentage).

From the standpoint of enhancing the cohesion of the PSA layer, the ratio of $C_{4-18}$ alkyl (meth)acrylate in the monomers is usually suitably 99.5% by weight or lower; it can be 95% by weight or lower, 85% by weight or lower, or even 75% by weight or lower. The monomers may include $C_{6-18}$ alkyl (meth)acrylate(s) up to an upper limit shown above.

In addition to the alkyl (meth)acrylate, the monomers forming the acrylic polymer may include, as necessary, another monomer (copolymerizable monomer) that is able to copolymerize with the alkyl (meth)acrylate. As the copolymerizable monomer, it is possible to suitably use a monomer having a polar group (e.g. a carboxy group, a hydroxy group, a nitrogen atom-containing ring, etc.) or a monomer having a relatively high (e.g. 10° C. or higher) homopolymer glass transition temperature. The monomer having a polar group may be useful for introducing a cross-linking point into the acrylic polymer or increasing cohesive strength of the PSA. For the copolymerizable monomer, solely one species or a combination of two or more species can be used.

Non-limiting specific examples of the copolymerizable monomer include those indicated below.

Carboxy group-containing monomers: for example, acrylic acid, methacrylic acid, carboxyethyl acrylate, carboxypentyl acrylate, itaconic acid, maleic acid, fumaric acid, crotonic acid and isocrotonic acid;

Acid anhydride group-containing monomers: for example, maleic anhydride and itaconic anhydride;

Hydroxy group-containing monomers: for example, hydroxyalkyl (meth)acrylates such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxyauryl (meth)acrylate and (4-hydroxymethylcyclohexyl)methyl (meth)acrylate;

Monomers having a sulphonate group or a phosphate group: for example, styrene sulphonic acid, allyl sulphonic acid, sodium vinylsulphonate, 2-(meth)acrylamide-2-methylpropane sulphonic acid, (meth)acrylamide propane sulphonic acid, sulphopropyl (meth)acrylate, (meth)acryloyloxy naphthalenesulphonic acid and 2-hydroxyethylacryloyl phosphate;

Epoxy group-containing monomers: for example, epoxy group-containing acrylates such as glycidyl (meth)acrylate and (meth)acrylate-2-ethyl glycidyl ether, allyl glycidyl ether and (meth)acrylate glycidyl ether;

Cyano group-containing monomers: for example, acrylonitrile and methacrylonitrile;

Isocyanato group-containing monomers: for example, 2-isocyanatoethyl (meth)acrylate;

Amido group-containing monomers: for example, (meth)acrylamide; N,N-dialkyl (meth)acrylamides such as N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide and N,N-di(t-butyl) (meth)acrylamide; N-alkyl (meth)acrylamides such as N-ethyl(meth)acrylamide, N-isopropyl(meth)acrylamide, N-butyl(meth)acrylamide and N-n-butyl(meth)acrylamide; N-vinylcarboxylic acid amides such as N-vinylacetamide; a monomer having a hydroxy group and an amide group, for example, an N-hydroxyalkyl(meth)acrylamide such as N-(2-hydroxyethyl)(meth)acrylamide, N-(2-hydroxypropyl)(meth)acrylamide, N-(1-hydroxypropyl)(meth)acrylamide, N-(3-hydroxypropyl)(meth)acrylamide, N-(2-hydroxybutyl)(meth)acrylamide, N-(3-hydroxybutyl)(meth)acrylamide, and N-(4-hydroxybutyl)(meth)acrylamide; a monomer having an alkoxy group and an amide group, for example, an N-alkoxyalkyl(meth)acrylamide such as N-methoxymethyl(meth)acrylamide, N-methoxyethyl(meth)acrylamide, and N-butoxymethyl(meth)acrylamide; and N,N-dimethylaminopropyl(meth)acrylamide, N-(meth)acryloylmorpholine, etc.

Amino group-containing monomers: for example, aminoethyl (meth)acrylate, N,N-dimethylaminoethyl (meth)acrylate and t-butylaminoethyl (meth)acrylate.

Epoxy group-containing monomers: for example, glycidyl (meth)acrylate, methylglycidyl (meth)acrylate, and allyl glycidyl ether.

Monomers having a nitrogen atom-containing ring: for example, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazin-2-one, N-vinyl-3,5-morpholinedione, N-vinylpyrazole, N-vinylisoxazole, N-vinylthiazole, N-vinylisothiazole and N-vinylpyridazine (such as lactams including N-vinyl-2-caprolactam);

Monomers having a succinimide backbone: for example, N-(meth)acryloyloxy methylene succinimide, N-(meth)acryloyl-6-oxy hexamethylene succinimide and N-(meth)acryloyl-8-oxy hexamethylene succinimide;

Maleimides: for example, N-cyclohexylmaleimide, N-isopropylmaleimide, N-laurylmaleimide and N-phenylmaleimide;

Itaconimides: for example, N-methyl itaconimide, N-ethyl itaconimide, N-butyl itaconimide, N-octyl itaconimide, N-2-ethylhexyl itaconimide, N-cyclohexyl itaconimide and N-lauryl itaconimide;

Aminoalkyl (meth)acrylates: for example, aminoethyl (meth)acrylate, N,N-dimethylaminoethyl (meth)acrylate, N,N-diethylaminoethyl (meth)acrylate and t-butylaminoethyl (meth)acrylate;

Alkoxy group-containing monomers: for example, alkoxyalkyl (meth)acrylates such as 2-methoxyethyl (meth)acrylate, 3-methoxypropyl (meth)acrylate, 2-ethoxyethyl (meth)acrylate, propoxyethyl (meth)acrylate, butoxyethyl (meth)acrylate and ethoxypropyl (meth)acrylate; alkoxy alkylene glycol (meth)acrylates such as methoxy ethylene glycol (meth)acrylate, methoxy poly(ethylene glycol) (meth)acrylate and methoxy poly(propylene glycol) (meth)acrylate;

Alkoxysilyl group-containing monomers, for example, alkoxysilyl group-containing (meth)acrylates such as (3-(meth)acryloxypropyl)trimethoxysilane, (3-(meth)acryloxypropyl)triethoxysilane, (3-(meth)acryloxypropyl)methyldimethoxysilane, and (3-(meth)acryloxypropyl)methyldiethoxysilane as well as alkoxysilyl group-containing vinyl compounds such as vinyltrimethoxysilane and vinyltriethoxysilane;

Vinyl esters: for example, vinyl acetate and vinyl propionate;

Vinyl ethers: for example, vinyl alkyl ethers such as methyl vinyl ether and ethyl vinyl ether;

Aromatic vinyl compounds: for example, styrene, α-methylstyrene and vinyl toluene;

Olefins: for example, ethylene, butadiene, isoprene and isobutylene;

(Meth)acrylic esters having an alicyclic hydrocarbon group: for example, alicyclic hydrocarbon group-containing (meth)acrylates such as cyclopentyl (meth)acrylate, cyclohexyl (meth)acrylate, isobornyl (meth)acrylate, dicyclopentanyl (meth)acrylate, and adamantyl (meth)acrylate;

(Meth)acrylic esters having an aromatic hydrocarbon group: for example, aromatic hydrocarbon group-containing (meth)acrylates such as phenyl (meth)acrylate, phenoxyethyl (meth)acrylate and benzyl (meth)acrylate;

Heterocyclic ring-containing (meth)acrylates such as tetrahydrofurfuryl (meth)acrylate, halogen atom-containing (meth)acrylates such as vinyl chloride and fluorine atom-containing (meth)acrylates, silicon atom-containing (meth)acrylates such as silicone (meth)acrylate, (meth)acrylic esters obtained from terpene compound derivative alcohols and the like.

When using such a copolymerizable monomer, its amount used is not particularly limited, but it is usually suitably at least 0.01% by weight of the entire monomers. From the standpoint of obtaining greater effect of the use of the copolymerizable monomer, the amount of copolymerizable monomer used can be 0.1% by weight or more of the entire monomers, or even 0.5% by weight or more. For easy balancing of adhesive properties, the amount of copolymerizable monomer used is suitably 50% by weight or less of the entire monomers, or preferably 40% by weight or less.

In some embodiments, the monomers forming the acrylic polymer may include a monomer having a nitrogen atom. This can enhance the PSAs cohesive strength and preferably increase the aged peel strength. A favorable example of the nitrogen atom-containing monomer is a monomer having a nitrogen atom-containing ring. As the monomer having a nitrogen atom-containing ring, the examples listed earlier and the like can be used, including, for instance, a cyclic N-vinyl amide represented by a general formula (1):

[Chem 2]

(1)

Here, in the general formula (1), $R^1$ is a divalent organic group, specifically $—(CH_2)_n—$; n is an integer between 2 and 7 (preferably 2, 3 or 4). In particular, N-vinyl-2-pyrrolidone can be preferably used. Other favorable examples of the nitrogen atom-containing monomer include (meth)acrylamides.

The amount of the nitrogen atom-containing monomer (preferably a monomer having a nitrogen atom-containing ring) used is not particularly limited. Of the entire monomers, it can be, for instance, 1% by weight or more, 3% by weight or more, even 5% by weight or more, or 7% by weight or more. In an embodiment, from the standpoint of increasing the adhesive strength, the amount of the nitrogen atom-containing monomer used can be 10% by weight or more, 15% by weight or more, or even 20% by weight or more of all monomers. The amount of the nitrogen atom-containing monomer used is suitably, for instance, 40% by weight or less of all monomers, possibly 35% by weight or less, 30% by weight or less, or even 25% by weight or less. In another embodiment, the amount of the nitrogen atom-containing monomer used can be, for instance, 20% by weight or less, or 15% by weight or less of all monomers.

In some embodiments, the monomers forming the acrylic polymer may include a hydroxy group-containing monomer. With the use of hydroxy group-containing monomer, the PSA's cohesive strength and crosslinking degree (e.g. crosslinking by an isocyanate crosslinking agent) can be favorably adjusted. When using a hydroxy group-containing monomer, its amount used can be, for instance, 0.01% by weight or more, 0.1% by weight or more, 0.5% by weight or more, 1% by weight or more, 5% by weight or more, or even 10% by weight or more of the entire monomers. From the standpoint of reducing the water absorption of the PSA layer, in some embodiments, the amount of hydroxy group-containing monomer used is, for instance, suitably 40% by weight or less of the entire monomers; it can be 30% by weight or less, 25% by weight or less, or even 20% by weight or less. In another embodiment, the amount of hydroxy group-containing monomer used can be, for instance, 15% by weight or less of all monomers, 10% by weight or less, or even 5% by weight or less.

In the PSA composition disclosed herein, the monomers of the acrylic polymer may include or may be free of the exemplified alkoxyalkyl (meth)acrylates and alkoxypolyalkylene glycol (meth)acrylates. In an embodiment of the art disclosed herein, of the monomers of the acrylic polymer, the alkoxyalkyl (meth)acrylate content is below 20% by weight and the alkoxypolyalkylene glycol (meth)acrylate content is below 20% by weight. By this, the PSA layer easily forms a sheet without problems such as gelation. By using the monomer composition, polymerization can be preferably carried out to obtain a desirable polymer (e.g. with a weight average molecular weight (Mw) above $30 \times 10^4$, typically Mw $40 \times 10^4$ or higher) while maintaining the non-volatile content of the monomer mixture within a certain range. The alkoxyalkyl (meth)acrylate content in the monomers is preferably below 10% by weight, more preferably below 3% by weight, or yet more preferably below 1% by weight. In a particularly preferable embodiment, the monomers are essentially free of alkoxyalkyl (meth)acrylates (0 to 0.3% content by weight). Similarly, the alkoxypolyalkylene (meth)acrylate content in the monomers is preferably below 10% by weight, more preferably below 3% by weight, or yet more preferably below 1% by weight. In a particularly preferable embodiment, the monomers are essentially free of alkoxypolyalkylene (meth)acrylates (0 to 0.3% content by weight).

From the standpoint of inhibiting gelation, in the monomers of the acrylic polymer according to a preferable embodiment, the combined amount of alkoxyalkyl (meth)acrylate and alkoxypolyalkylene (meth)acrylate is limited to below 20% by weight. The combined amount of alkoxyalkyl (meth)acrylate and alkoxypolyalkylene (meth)acrylate is preferably below 10% by weight, more preferably below 3% by weight, or yet more preferably below 1% by weight. In a particularly preferable embodiment, the monomers are essentially free of alkoxyalkyl (meth)acrylates and alkoxypolyalkylene (meth)acrylates (0 to 0.3% content by weight).

Similarly, the monomers of the acrylic polymer disclosed herein may include less than 20% (by weight) alkoxy group-containing monomer or may be essentially free thereof. The amount of alkoxy group-containing monomers in the monomers is preferably below 10% by weight, more preferably below 3% by weight, or yet more preferably below 1% by weight. In a particularly preferable embodiment, the monomers are essentially free of alkoxy group-containing monomers (0 to 0.3% content by weight).

In some embodiments, the amount of carboxy group-containing monomers in the monomers of the acrylic polymer can be, for instance, 2% by weight or less, 1% by weight or less, or even 0.5% by weight or less (e.g. below 0.1% by weight). Carboxy group-containing monomers may not substantially used as the monomers of the acrylic polymer. Here, that carboxy group-containing monomers are not substantially used means that carboxy group-containing monomers are not used at least intentionally. Acrylic polymer having such a composition is likely to have highly reliable water-resistance and may have metal corrosion-inhibiting properties on a metal-containing adherend.

In a preferable embodiment, the monomers of the acrylic polymer include a limited hydrophilic monomer content. This can preferably bring about water-peeling properties by the compound A. The "hydrophilic monomer" here refers to a carboxy group-containing monomer, an acid anhydride group-containing monomer, a hydroxy group-containing monomer, an N-containing monomer (typically an amide group-containing monomer such as (meth)acrylamide, a monomer having a N-containing ring) or an alkoxy group-containing monomer (typically an alkoxyalkyl (meth)acrylate or an alkoxypolyalkylene glycol (meth)acrylate). In this embodiment, the hydrophilic monomer content in the monomers of the acrylic polymer is suitably 40% by weight or less (e.g. 35% by weight or less), preferably 32% by weight or less, for instance, possibly 30% by weight or less, or even 28% by weight or less. While no particular limitations are imposed, of the monomers of the acrylic polymer, the hydrophilic monomer content can be 1% by weight or greater, 10% by weight or greater, or even 20% by weight or greater.

In some embodiments, the monomers forming the acrylic polymer may include an alicyclic hydrocarbon group-containing (meth)acrylate. This can increase the PSAs cohesive strength and aged peel strength. As the alicyclic hydrocarbon group-containing (meth)acrylate, the aforementioned examples and the like can be used. For instance, cyclohexyl acrylate and isobornyl acrylate can be preferably used. When using an alicyclic hydrocarbon group-containing (meth)acrylate, its amount used is not particularly limited. For instance, of the entire monomers, it can be 1% by weight or greater, 3% by weight or greater, or even 5% by weight or greater. In an embodiment, the amount of alicyclic hydrocarbon group-containing (meth)acrylate used can be 10% by weight or more, or even 15% by weight or more of the entire monomers. The maximum amount of alicyclic hydrocarbon group-containing (meth)acrylate used is suitably about 40% by weight or less, for instance, possibly 30% by weight or less, or also 25% by weight or less (e.g. 15% by weight or less, or even 10% by weight or less).

The composition of the monomers forming the acrylic polymer can be selected so that the glass transition temperature determined by the Fox equation based on the monomer composition is −75° C. or higher and −10° C. or lower. In some embodiments, from the standpoint of the cohesion, impact resistance, etc., the Tg is suitably 0° C. or lower, preferably −10° C. or lower, more preferably −20° C. or lower, or possibly −30° C. or lower. The Tg can be, for instance, −60° C. or higher, −50° C. or higher, −45° C. or higher, or even −40° C. or higher.

Here, the Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

As the glass transition temperatures of homopolymers used for determining the Tg value, values found in publicly known documents are used. For example, with respect to the monomers listed below, as the glass transition temperatures of homopolymers of the monomers, the following values are used:

| | |
|---|---|
| 2-ethylhexyl acrylate | −70° C. |
| n-butyl acrylate | −55° C. |
| isostearyl acrylate | −18° C. |
| methyl methacrylate | 105° C. |
| methyl acrylate | 8° C. |
| cyclohexyl acrylate | 15° C. |
| N-cinyl-2-pyrrolidone | 54° C. |
| 2-hydroxyethyl acrylate | −15° C. |
| 4-hydroxybutyl acrylate | −40° C. |
| dicyclopentanyl methacrylate | 175° C. |
| isobornyl acrylate | 94° C. |
| acrylic acid | 106° C. |
| methacrylic acid | 228° C. |

With respect to the glass transition temperatures of homopolymers of monomers other than those listed above, values given in "*Polymer Handbook*" (3rd edition, John Wiley & Sons, Inc., Year 1989) are used. When the literature provides two or more values, the highest value is used.

With respect to monomers for which no glass transition temperatures of the corresponding homopolymers are given in *Polymer Handbook*, either, values obtained by the following measurement method are used (see Japanese Patent Application Publication No. 2007-51271). In particular, to a reaction vessel equipped with a thermometer, a stirrer, a nitrogen inlet and a condenser, are added 100 parts by weight of monomer, 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature, and a homopolymer solution having 33% by weight solids content is obtained. Then, this homopolymer solution is applied onto a release liner by flow coating and allowed to dry to prepare a test sample (a sheet of homopolymer) of about 2 mm thickness. This test sample is cut out into a disc of 7.9 mm diameter and is placed between parallel plates; and while applying a shear strain at a frequency of 1 Hz using a rheometer (ARES, available from Rheometrics Scientific, Inc.), the viscoelasticity is measured in the shear mode over a temperature range of −70° C. to 150° C. at a heating rate of 5° C./min; and the temperature corresponding to the peak top of the tan δ curve is taken as the Tg of the homopolymer.

While no particular limitations are imposed, the acrylic polymer disclosed herein preferably has an SP value of 23.0 $(MJ/m^3)^{1/2}$ or lower. When a compound A described later is included in the PSA comprising an acrylic polymer having such an SP value, a PSA having sufficient adhesive strength and excellent water-peeling properties can be preferably obtained. The SP value is more preferably 21.0 $(MJ/m^3)^{1/2}$ or lower (e.g. 20.0 $(MJ/m^3)^{1/2}$ or lower). The minimum SP value is not particularly limited. For instance, it is possibly about 10.0 $(MJ/m^3)^{1/2}$ or higher, suitably about 15.0 $(MJ/m^3)^{1/2}$ or higher, or preferably 18.0 $(MJ/m^3)^{1/2}$ or higher.

The SP value of an acrylic polymer can be determined according to the calculation method by Fedors (reference: POLYMER ENG. & SCI., vol. 14, issue 2 (1974), pp 148-154), that is, the equation:

$$\text{SP value } \delta = (\Sigma \Delta e / \Sigma \Delta v)^{1/2}$$

(In the equation, Δe is the vaporization energy of each atom or an atomic group at 25° C. and Δv is the molar volume of the atom or the atomic group at the same temperature)

An acrylic polymer having such an SP value can be obtained by suitably deciding on a monomer composition based on common technical knowledge of a skilled person.

The PSA composition includes monomers having an aforementioned composition in a polymer form, in a non-polymerized form (i.e. a form where polymerizable functional groups are unreacted), or as a mixture of these; and the PSA composition further includes a compound A. The PSA composition may exist in various forms such as a water-dispersed PSA composition in which the PSA (adhesive component) is dispersed in water, a solvent-based PSA composition containing the PSA in an organic solvent, an active energy ray-curable PSA composition prepared to form PSA when cured by active energy rays such as UV rays and radioactive rays, a hot-melt PSA composition that is applied in a thermally melted state and forms PSA when cooled to near room temperature. The PSA composition according to a preferable embodiment is a solvent-based PSA composition or a solvent-free PSA composition. The solvent-free PSA composition encompasses the active energy ray-curable PSA composition and the hot-melt PSA composition.

In the polymerization, a known or commonly used thermal polymerization initiator or photopolymerization initiator can be used in accordance with the polymerization method and polymerization conditions. These polymerization initiators can be used solely as one species or in a combination of two or more species.

The thermal polymerization initiator is not particularly limited. For example, azo-based polymerization initiator, peroxide-based polymerization initiator, a redox-based polymerization initiator by combination of a peroxide and a reducing agent, substituted ethane-based polymerization initiator and the like can be used. More specific examples include, but not limited to, azo-based initiators such as 2,2'-azobisisobutyronitrile (AIBN), 2,2'-azobis(2-methylpropionamidine) disulfate, 2,2'-azobis(2-amidinopropane) dihydrochloride, 2,2'-azobis[2-(5-methyl-2-imidazolin-2-yl)propane] dihydrochloride, 2,2'-azobis(N,N'-dimethyleneisobutylamidine), and 2,2'-azobis[N-(2-carboxyethyl)-2-methylpropionamidine]hydrate; persulfates such as potassium persulfate and ammonium persulfate; peroxide-based initiators such as benzoyl peroxide, t-butyl hydroperoxide, and hydrogen peroxide; substituted ethane-based initiators such as phenyl-substituted ethane; redox-based initiators such as combination of a persulfate salt and sodium hydrogen sulfite, and combination of a peroxide and sodium ascorbate. Thermal polymerization can be preferably carried out at a temperature of, for instance, about 20° C. to 100° C. (typically 40° C. to 80° C.).

The photopolymerization initiator is not particularly limited. It is possible to use, for instance, ketal-based photopolymerization initiators, acetophenone-based photopolymerization initiators, benzoin ether-based photopolymerization initiators, acylphosphine oxide-based photopolymerization initiators, α-ketol photopolymerization initiators, aromatic sulphonyl chloride-based photopolymerization initiators, photoactive oxime-based photopolymerization initiators, benzoin-based photopolymerization initiators, benzylic photopolymerization initiators, benzophenone-based photopolymerization initiators, and thioxanthone-based photopolymerization initiators.

Such thermal polymerization initiator or photopolymerization initiator can be used in a usual amount in accordance with the polymerization method, embodiment of polymerization, etc., and there are no particular limitations to the amount. For instance, relative to 100 parts by weight of monomers to be polymerized, about 0.001 part to 5 parts by weight (typically about 0.01 part to 2 parts by weight, e.g. about 0.01 part to 1 part by weight) of polymerization initiator can be used.

In the polymerization, various kinds of heretofore known chain transfer agent (which may also be thought as molecular weight-adjusting agent or polymerization degree-adjusting agent) can be used as necessary. As the chain transfer agent, mercaptans can be preferably used, such as n-dodecyl mercaptan, t-dodecyl mercaptan, thioglycolic acid and α-thioglycerol. Alternatively, a chain transfer agent free of sulfur atoms (a sulfur-free chain transfer agent) can be used as well. Specific examples of the sulfur-free chain transfer agent include anilines such as N,N-dimethylaniline and N,N-diethylanilne; terpenoids such as α-pinene and terpinolene; styrenes such as α-methylstyrene and α-methylstyrene dimer; compounds having benzylidenyl groups such as dibenzylidene acetone, cinnamyl alcohol and cinnamyl aldehyde; hydroquinones such as hydroquinone and naphthohydroquinone; quinones such as benzoquinone and naphthoquinone; olefins such as 2,3-dimethyl-2-butene and 1,5-cyclooctadiene; alcohols such as phenol, benzyl alcohol and allyl alcohol; and benzyl hydrogens such as diphenylbenzene and triphenylbenzene.

For the chain transfer agent, solely one species or a combination of two or more species can be used. When using a chain transfer agent, it can be used in an amount of, for instance, about 0.01 part to 1 part by weight to 100 parts by weight of the monomers. The art disclosed herein can also be preferably implemented in an embodiment that uses no chain transfer agent.

The molecular weight of the acrylic polymer obtained by suitably employing the aforementioned various polymerization methods is not particularly limited and can be selected in a range suited for required properties. The acrylic polymer usually suitably has a weight average molecular weight (Mw) of about $10 \times 10^4$ or higher (e.g. $20 \times 10^4$ or higher). From the standpoint of combining well-balanced cohesive strength and adhesive strength, it is suitably above $30 \times 10^4$. From the standpoint of obtaining good bonding reliability even in a high temperature environment, the acrylic polymer according to an embodiment preferably has a Mw of $40 \times 10^4$ or higher (typically about $50 \times 10^4$ or higher, e.g. about $55 \times 10^4$ or higher). According to a preferable embodiment of the art disclosed herein, because the monomer composition can be designed to inhibit gelation, the concentration of non-volatiles can be suitably selected to obtain polymers in these ranges with good productivity. The maximum Mw of the acrylic polymer can be usually about $500 \times 10^4$ or lower (e.g. about $150 \times 10^4$ or lower). The Mw can also be about $75 \times 10^4$ or lower. The Mw here refers to the value based on standard polystyrene determined by gel permeation chromatography (GPC). As the GPC system, for instance, model name HLC-8320 GPC (column: TSKgel GMH-H(S) available from Tosoh Corporation) can be used. The same applies to the Examples described later. The Mw can be the Mw of the acrylic polymer either in the PSA composition or in the PSA layer.

The PSA composition according to some embodiments can be an active energy ray-curable PSA composition comprising a compound A. The term "active energy ray" in this Description refers to an energy ray having energy capable of causing a chemical reaction such as polymerization, cross-linking, initiator decomposition, etc. Examples of the active energy ray herein include lights such as ultraviolet (UV) rays, visible lights, infrared lights, radioactive rays such as α rays, β rays, γ rays, electron beam, neutron radiation, and X rays. A favorable example of the active energy ray-curable PSA composition is a photocurable PSA composition. The photocurable PSA composition has an advantage of being able to easily form even a thick PSA layer. In particular, a UV ray-curable PSA composition is preferable.

The photocurable PSA composition typically comprises at least some of the monomers used to form the composition (possibly a certain species among the monomers or a fraction of its quantity) as a polymer. The polymerization method for forming the polymer is not particularly limited. Heretofore known various polymerization methods can be suitably used. For instance, thermal polymerization (typically carried out in the presence of a thermal polymerization initiator) such as solution polymerization, emulsion polymerization, bulk polymerization, etc.; photopolymerization carried out by irradiating light such as UV ray, etc. (typically in the presence of a photopolymerization initiator); radioactive ray polymerization carried out by irradiating radioactive rays such as β rays, γ rays, etc.; and the like. In particular, photopolymerization is preferable.

The photocurable PSA composition according to a preferable embodiment comprises a partial polymer (partial polymerization product) of the monomers. Such a partial polymer is typically a mixture of a polymer derived from the monomers and unreacted monomers, and it preferably has a syrup form (viscous liquid). Hereinafter, a partial polymer having such a form may be referred to as "monomer syrup" or simply "syrup." The polymerization method for partial polymerization of the monomers is not particularly limited. Various polymerization methods such as those described earlier can be suitably selected and used. From the standpoint of the efficiency and convenience, a photopolymerization method can be preferably used. Photopolymerization allows easy control of the monomer conversion of the monomers through the polymerization conditions such as the radiation dose (amount) of light.

The monomer conversion of the monomer mixture in the partial polymer is not particularly limited. The monomer conversion can be, for instance, about 70% by weight or less, or preferably about 60% by weight or less. From the standpoint of the ease of preparing the PSA composition containing the partial polymer, the ease of coating, etc., the monomer conversion is usually suitably about 50% by weight or less, or preferably about 40% by weight or less (e.g. about 35% by weight or less). The minimum monomer conversion is not particularly limited. It is typically about 1% by weight or greater, or usually suitably about 5% by weight or greater.

The PSA composition containing a partial polymer of the monomers can be obtained by partially polymerizing a monomer mixture containing the entire amount of the monomers used for preparing the PSA composition by a suitable polymerization method (e.g. a photopolymerization method). The PSA composition containing a partial polymer of the monomers can be a mixture of a partially or fully polymerized product of a part of the monomers used for preparing the PSA composition, and remaining monomers or a partial polymer thereof. As used herein, the "fully polymerized product" indicates that the monomer conversion is above 95% by weight.

The partial polymer-containing PSA composition may include peel strength enhancer and other components (e.g. photopolymerization initiator as well as crosslinking agent, polyfunctional monomer, acrylic oligomer, tackifier resin and the like described later) used as necessary. The method of adding such other components is not particularly limited. For instance, it can be included in the monomer mixture in advance or added to the partial polymer as well.

The PSA composition according to some embodiments can be a solvent-based PSA composition comprising a compound A. The solvent-based PSA composition typically includes a solution polymerization product of the monomers, a compound A, and additives (e.g. peel strength enhancer) used as necessary. The solvent (polymerization solvent) used for the solution polymerization can be suitably selected among heretofore known organic solvents. For instance, it is possible to use one species of solvent or a mixture of two or more solvents, selected among aromatic compounds (typically aromatic hydrocarbons) such as toluene; esters such as ethyl acetate and butyl acetate; aliphatic or alicyclic hydrocarbons such as hexane and cyclohexane; halogenated alkanes such as 1,2-dichloroethane; lower alcohols such as isopropanol (e.g. monohydric alcohols having 1 to 4 carbon atoms); ethers such as tert-butyl methyl ether; and ketones such as methyl ethyl ketone. Solution polymerization gives the polymerization reaction mixture in a form where the polymerization product of the monomers is dissolved in a polymerization solvent. The solvent-based PSA composition disclosed herein can be preferably produced using the polymerization reaction mixture.

To the solvent-based PSA, in addition to the compound A, other components (e.g. photopolymerization initiator as well as crosslinking agent, polyfunctional monomers, acrylic oligomers and the like described later) used as necessary can be added. The solvent-based PSA composition may be provided with, for instance, photocuring properties (photo-crosslinking properties) by adding a polyfunctional monomer and a photopolymerization initiator to the polymerization reaction mixture.

(Compound A)

The PSA composition disclosed herein may be typically characterized by comprising at least one species of compound A selected among surfactants and compounds having polyoxyalkylene backbones. By this, the peel strength can be effectively reduced, using an aqueous liquid such as water. While reasons for this are not limited to particular interpretation, it is presumed that the surfactant or the compound having a polyoxyalkylene backbone has a hydrophilic region and, because of this, it is unevenly distributed on the PSA layer surface and effectively reduces the peel strength upon contact with water. As that the surfactant and the compound having a polyoxyalkylene backbone, one, two or more species can be used among known surfactants and compounds having polyoxyalkylene backbones without particular limitations. In typical, the compound A is preferably included in a free state in the PSA composition (and further in the PSA layer). As the compound A, from the standpoint of the ease of preparing the PSA composition, a species that exits as liquid at room temperature (about 25° C.) is preferably used. It is needless to say that among the surfactants, there are compounds having polyoxyalkylene backbones, and the reverse is true as well.

The HLB of the compound A (typically a surfactant) is not particularly limited. It is, for instance, 3 or higher, suitably about 6 or higher, or possibly 8 or higher (e.g. 9 or higher). In a preferable embodiment, the compound A has an HLB of 10 or higher. This tends to preferably bring about water-peeling properties. The HLB is more preferably 11 or higher, yet more preferably 12 or higher, or particularly preferably 13 or higher (e.g. 14 or higher, 15 or higher, or even 16 or higher). With the PSA composition including an acrylic polymer having an SP value of 23.0 $(MJ/m^3)^{1/2}$ or lower (e.g. 18.0 $(MJ/m^3)^{1/2}$ to 23.0 $(MJ/m^3)^{1/2}$), the PSA composition (and further the PSA layer) includes a compound A having an HLB in these ranges, water-peeling properties can be more effectively exhibited. The maximum HLB is 20 or lower, for instance, possibly 18 or lower, or even 16 or lower (e.g. 15 or lower).

HLB in this Description is hydrophile-lipophile balance by Griffin, and the value indicates the degree of affinity of a surfactant to water and oil, and the ratio between hydrophilicity and lipophilicity is represented by a numerical value between 0 and 20. HLB is defined in J. Soc. Cosmetic Chemists, 1, 311 (1949) by W. C. Griffin; "Surfactant Handbook" by Koshitami Takahashi, Yoshiro Namba, Motoo Koike and Masao Kobayashi, 3rd edition, Kogaku Tosho Publishing, Nov. 25, 1972, p 179-182; and the like. A hydrophilicity enhancer having such HLB can be selected based on technical common knowledge of those skilled in the art, taking into account these reference documents as necessary.

As for the surfactant possibly used as the compound A, known nonionic surfactant, anionic surfactant, cationic surfactant and the like can be used. Among them, nonionic surfactant is preferable. As the surfactant, solely one species or a combination of two or more species can be used.

Examples of the nonionic surfactant include polyoxyethylene alkyl ethers such as polyoxyethylene lauryl ether, polyoxyethylene cetyl ether, polyoxyethylene stearyl ether and polyoxyethylene oleyl ether; polyoxyethylene alkyl phenyl ethers such as polyoxyethylene octyl phenyl ether and polyoxyethylene nonyl phenyl ether; sorbitan fatty acid esters such as sorbitan monolaurate, sorbitan monopalmitate, sorbitan monostearate and sorbitan monooleate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan triisostearate, polyoxyethylene sorbitan monooleate and polyoxyethylene sorbitan trioleate; polyoxyethylene glyceryl ether fatty acid esters; and polyoxyethylene-polyoxypropylene block polymers. Among these nonionic surfactants, solely one species or a combination of two or more species can be used.

Examples of the anionic surfactant include alkyl sulfates such as lauryl sulfate and octadecyl sulfate; fatty acid salts; alkyl benzene sulfonates such as nonyl benzene sulfonate and dodecyl benzene sulfonate; naphthalene sulfonates such as dodecylnaphthalene sulfonate; alkyl diphenyl ether disulfonate such as dodecyl diphenyl ether disulfonate; polyoxyethylene alkyl ether sulfates such as polyoxyethylene octadecyl ether sulfate and polyoxyethylene lauryl ether sulfate; polyoxyethylene alkyl phenyl ether sulfates such as polyoxyehtylene lauryl phenyl ether sulfate; polyoxyethylene styrenated phenyl ether sulfate; sulfosuccinates such as lauryl sulfosuccinate and polyoxyethylene lauryl sulfosuccinate; polyoxyethylene alkyl ether phosphates; and polyoxyethylene alkyl ether acetates. When the anionic surfactant is in a salt form, the salt can be, for instance, a metal salt (preferably a monovalent metal salt) such as sodium salt, potassium salt, calcium salt and magnesium salt; ammonium salt; or amine salt. Among these anionic surfactants, solely one species or a combination of two or more species can be used.

As the compound having a polyoxyalkylene backbone that can be used as the compound A, it is possible to use, for instance, polyalkylene glycols such as polyethylene glycol (PEG) and polypropylene glycol (PPG); polyethers containing polyoxyethylene units; polyethers containing polyoxypropylene units; compounds containing oxyethylene units and oxypropylene units (the sequence of these units may be random or blocked); and derivatives of these. Among the aforementioned surfactants, a compound having a polyoxyalkylene backbone can be used as well. These can be used solely as one species or in a combination of two or more species. Among them, it is preferable to use a compound containing a polyoxyethylene backbone (or a polyoxyethylene segment). PEG is more preferable.

The molecular weight (chemical formula weight) of the polyoxyalkylene backbone-containing compound (e.g. polyethylene glycol) is not particularly limited. For instance, it is suitably lower than 1000. In view of the ease of preparation of PSA composition, it is preferably about 600 or lower (e.g. 500 or lower). The minimum molecular weight of the polyoxyalkylene backbone-containing compound (e.g. polyethylene glycol) is not particularly limited. A preferably used species has a molecular weight of about 100 or higher (e.g. about 200 or higher, or even about 300 or higher).

In the PSA composition according to an embodiment, the amount of the compound A used is possibly about 3 parts by weight or less, or suitably about 2 parts by weight or less to 100 parts by weight of the acrylic polymer (which can be the total amount of the monomers forming the acrylic polymer; the same applies hereinafter unless otherwise noted). From the standpoint of the optical properties such as transparency, it is preferably below 1 part by weight, more preferably below 0.7 part by weight, or yet more preferably below 0.3 part by weight (e.g. below 0.2 part by weight). With a limited usage of the compound A, the adhesive strength tends to be easily maintained. A compound A having an HLB of 10 or higher tends to bring about good water-peeling properties even when added in a small amount. From the standpoint of obtaining the effect of the addition of compound A, the amount of the compound A relative to 100 parts by weight of the acrylic polymer can be 0.001 part by weight or greater; for instance, it is suitably 0.01 part by weight or greater, or preferably 0.03 part by weight or greater (e.g. 0.1 part by weight or greater). In a composition where water-peeling properties are important, the amount of the compound A relative to 100 parts by weight of the acrylic polymer can be 0.3 part by weight or greater (e.g. 0.5 part by weight or greater).

(Peel Strength Enhancer)

The PSA composition disclosed herein may include a peel strength enhancer. As the peel strength enhancer, it is possible to suitably select and use a material capable of increasing the peel strength of the PSA sheet on an adherend after the surface (adhesive face) of the PSA layer formed from the PSA composition is applied to the adherend. As the peel strength enhancer, for instance, a known silane coupling agent can be used. The peel strength enhancer is preferably included in a free state in the PSA composition (also in the PSA layer). In typical, it is preferable that the peel strength enhancer is not chemically bonded to other possible components of the PSA composition (further of the PSA layer). The inclusion of peel strength enhancer in such a form in the PSA composition can effectively contribute to an increase in peel strength.

The silane coupling agent is typically a compound that includes functional groups X and Y in one molecule, with the functional group X being an alkoxysilyl group. The alkoxysilyl group is a functional group having at least one alkoxy group on a silicon atom. When the PSA layer's surface is supplied with a silane coupling agent after adhered to the adherend, silanol groups formed upon hydrolysis of alkoxy groups can react with hydroxy groups on the adherend's surface, thereby increasing the PSA sheet's peel strength relative to the adherend. The alkoxysilyl group hydrolyzes to form a silanol group which reacts with a hydroxy group on the adherend's surface. Thus, the alkoxysilyl group is a precursor of the group that reacts with the hydroxy group.

The alkoxy group forming the alkoxysilyl group is typically a methoxy group or an ethoxy group. In typical, the methoxy group with higher hydrolytic activity is preferable. The alkoxysilyl group can be a trialkoxysilyl group or a dialkoxysilyl group. From the standpoint of enhancing the peel strength-enhancing effect, in some embodiments, a silane coupling agent having a trialkoxysilyl group can be preferably used.

The functional group Y can be, for instance, an epoxy group, amino group, isocyanate group (possibly forming an isocyanurate), acetoacetyl group, (meth)acryloyl group, mercapto group, vinyl group, halogen group, etc. Examples of a silane coupling agent having such functional group Y include epoxy group-containing silane coupling agents such as 3-glycidoxypropyltrimethoxysilane, 3-glycidoxypropyltriethoxysilane, 3-glycidoxypropylmethyldimethoxysilane and 2-(3,4-epoxycyclohexyl) ethyltrimethoxysilane; amino group-containing silane coupling agents such as 3-aminopropyltrimethoxysilane, N-(2-aminoethyl)3-aminopropyltrimethoxysilane and N-(2-aminoethyl) 3-aminopropylmethyldimethoxysilane; 3-chloropropyltrimethoxysilane; isocyanate group-containing silane coupling agents such as 3-isocyanatopropyltriethoxysilane and tris(trimethoxysilylpropyl)isocyanurate; acetoacetyl group-containing silane coupling agents such as acetoacetyl group-containing trimethoxysilane; (meth)acryloyl group-containing silane coupling agents such as 3-methacryloxypropyltrimethoxysilane and 3-methacryloxypropyltriethoxysilane; vinyl group-containing silane coupling agents such as vinyltrimethoxysilane and vinyltriethoxysilane; 3-methacryloxypropylmethyldimethoxsilane; mercapto group-containing silane coupling agents; halogenated alkyl group-containing silane coupling agents such as 3-chloropropyltrimethoxysilane. Among them, epoxy group-containing silane coupling agents are preferable, such as (glycidoxypropyl)trialkoxysilane (e.g. (3-glycidoxypropyl) trimethoxysilane and (3-glycidoxypropyl)triethoxysilane).

As the silane coupling agent, it is possible to use a species having a functional group Y that reacts with a functional group y in the PSA layer. From the standpoint of the reactivity at room temperature, in one combination, the functional group y is carboxy group and the silane coupling agent has epoxy group as the functional group Y. Examples of other combinations include combinations of amino group and epoxy group, hydroxy group and epoxy group, carboxy group and amino group, isocyanate group and amino group, sulfo group and amino group, etc. On the other hand, in some embodiments, from the standpoint of maintaining the free state of the peel strength enhancer in the PSA composition to facilitate the transfer of the peel strength enhancer to the surface, the PSA composition may be free of a functional group y (e.g. carboxy group) that reacts with the functional group Y (e.g. epoxy group) of the silane coupling agent.

The molecular weight (chemical formula weight) of the silane coupling agent is not particularly limited. It can be, for instance, about 120 to 100. In typical, from the standpoint of easy adjustment of the reworkable period and easy transfer to the adhesive face, a preferable silane coupling agent typically has a molecular weight of 180 or higher, 200 or higher, or 220 or higher. For the same reason, a preferable silane coupling agent has a molecular weight of 800 or lower, 600 or lower, 400 or lower, or 300 or lower. In some embodiments, a silane coupling agent having a molecular weight of 200 or higher and 300 or lower can be preferably used. As the molecular weight value of the silane coupling agent, a value determined based on the structural formula of the silane coupling agent is used. Alternatively, a nominal value by the manufacturer can be used as well.

The amount of peel strength enhancer (e.g. silane coupling agent) in the PSA composition disclosed herein can be selected to obtain desirable use effect and is not particularly limited. The amount of peel strength enhancer can be, for instance, 0.005 part by weight or greater to 100 parts by weight of the acrylic polymer in the PSA composition. The peel strength enhancer content per 100 parts by weight of the acrylic polymer is typically suitably 0.05 part by weight or greater, or possibly 0.10 part by weight or greater, 0.20 part by weight or greater, or even 0.30 part by weight or greater. The peel strength enhancer content can be increased to obtain the peel strength-enhancing effect. Depending on the form of use, when the period until the peel strength starts to increase with time at room temperature is too short, the reworkable period may become too short, thereby causing inconvenience such as complicated process management. From such a standpoint, in some embodiments, the peel strength enhancer content per 100 parts by weight of the acrylic polymer in the PSA composition can be, for instance, 5 parts by weight or less, 3 parts by weight or less, 1 part by weight or less, or even 0.7 part by weight or less (e.g. 0.5 part by weight or less). The art disclosed herein can be practiced in an embodiment using a PSA composition essentially free of a peel strength enhancer (e.g. silane coupling agent). By limiting the usage of peel strength enhancer or not using the peel strength enhancer, the increase in adhesive strength with time can be reduced and good water-peeling properties can be preferably obtained even after heated storage.

(Crosslinking Agent)

The PSA composition disclosed herein can include a crosslinking agent as necessary, mainly for crosslinking within the PSA layer or between the PSA layer and the adjacent surface. The type of crosslinking agent is not particularly limited and can be selected among heretofore known crosslinking agents so that, for instance, the crosslinking agent provides suitable crosslinking within the PSA layer in accordance with the composition of the PSA composition. Examples of the crosslinking agent that can be used include isocyanate-based crosslinking agent, epoxy-based crosslinking agent, oxazoline-based crosslinking agent, aziridine-based crosslinking agent, carbodiimide-based crosslinking agent, melamine-based crosslinking agent, urea-based crosslinking agent, metal alkoxide-based crosslinking agent, metal chelate-based crosslinking agent, metal salt-based crosslinking agents, hydrazine-based crosslinking agent, and amine-based crosslinking agent. These can be used solely as one species or in a combination of two or more species.

As the isocyanate-based crosslinking agent, a bifunctional or higher polyfunctional isocyanate compound can be used. Examples include aromatic isocyanates such as tolylene diisocyanate, xylene diisocyanate, polymethylene polyphenyl diisocyanate, tris (p-isocyanatophenyl)thiophosphate, and diphenylmethane diisocyanate; alicyclic isocyanates such as isophorone diisocyanate; and aliphatic isocyanates such as hexamethylene diisocyanate. Commercial products include isocyanate adducts such as trimethylolpropane/tolylene diisocyanate trimer adduct (trade name CORONATE L available from Tosoh Corporation), trimethylolpropane/hexamethylene diisocyanate trimer adduct (trade name CORONATE HL available from Tosoh Corporation), and isocyanurate of hexamethylene diisocyanate (trade name CORONATE HX available from Tosoh Corporation).

As the epoxy-based crosslinking agent, a species having two or more epoxy groups per molecule can be used without particular limitations. A preferable epoxy-based crosslinking agent has 3 to 5 epoxy groups per molecule. Specific examples of the epoxy-based crosslinking agent include N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Examples of commercial epoxy-based crosslinking agents include product names TETRAD-X and TETRAD-C available from Mitsubishi Gas Chemical Co., Inc.; product name EPICLON CR-5L available from DIC Corp.; product name DENACOL EX-512 available from Nagase ChemteX Corporation; and product name TEPIC-G available from Nissan Chemical Industries, Ltd.

As the oxazoline-based crosslinking agent, a species having one or more oxazoline groups in one molecule can be used without particular limitations.

Examples of the aziridine-based crosslinking agent include trimethylolpropane tris[3-(1-aziridinyl)propionate] and trimethylolpropane tris[3-(1-(2-methyl) aziridinylpropionate)].

As the carbodiimide-based crosslinking agent, a low molecular weight compound or a high molecular weight compound having two or more carbodiimide groups can be used.

In some embodiments, a peroxide can also be used as the crosslinking agent. Examples of the peroxide include di(2-ethylhexyl) peroxydicarbonate, di(4-t-butylcyclohexyl) peroxydicarbonate, di-sec-butylperoxydicarbonate, t-butylperoxyneodecanoate, t-hexylperoxypivalate, t-butylperoxypivalate, dilauroyl peroxide, di-n-octanoyl peroxide, 1,1,3,3-tetramethylbutylperoxyisobutyrate, and dibenzoyl peroxide. Among these, peroxides having particularly excellent crosslinking reaction efficiency include di(4-t-butylcyclohexyl) peroxydicarbonate, dilauroyl peroxide, and dibenzoyl peroxide. It is noted that when a peroxide is used as the polymerization initiator, the remaining peroxide unused in the polymerization reaction can be used for the crosslinking reaction. In this case, when the remaining peroxide is quantified and the proportion of peroxide is less than a prescribed amount, the peroxide can be added as necessary to obtain the prescribed amount. Peroxide can be quantified by the method described in Japanese Patent No. 4971517.

The crosslinking agent content (when two or more crosslinking agents are included, the total amount thereof) is not particularly limited. From the standpoint of obtaining a PSA that exhibits well-balanced adhesive properties such as adhesive strength and cohesive strength, the crosslinking agent content is usually suitably 5 parts by weight or less to 100 parts by weight of the acrylic polymer in the PSA composition, preferably about 0.001 part to 5 parts by weight, more preferably about 0.001 part to 4 parts by weight, or yet more preferably about 0.001 part to 3 parts by weight. Alternatively, the PSA composition can also be free of aforementioned crosslinking agents. When using a photocurable PSA composition as the PSA composition disclosed herein, the PSA composition can be essentially free of a crosslinking agent such as an isocyanate-based crosslinking agent. Here, that the PSA composition is essentially free of a crosslinking agent (typically an isocyanate-based crosslinking agent) means that the amount of crosslinking agent relative to 100 parts by weight of the acrylic polymer is less than 0.05 part by weight (e.g. less than 0.01 part by weight).

Tb allow an aforementioned crosslinking reaction to proceed effectively, a crosslinking catalyst may be used. Examples of the crosslinking catalyst include metal-based crosslinking catalysts such as tetra-n-butyl titanate, tetraisopropyl titanate, ferric acetylacetonate, butyltin oxide, and dioctyltin dilaurate. In particular, a tin-based crosslinking catalyst such as dioctyltin dilaurate is preferable. The amount of crosslinking catalyst used is not particularly limited. To 100 parts by weight of the acrylic polymer in the PSA composition, the amount of crosslinking catalyst used can be, for instance, about 0.0001 part or greater and 1 part by weight or less, 0.001 part or greater and 0.1 part by weight or less, or 0.005 part by weight or greater and 0.5 part by weight or less.

In the PSA composition (and further in the PSA layer), a polyfunctional monomer may be used as necessary. The polyfunctional monomer used in place of or in combination with a crosslinking agent as described above may be helpful for purposes such as adjusting the cohesive strength. For instance, it is preferable to use a polyfunctional monomer in a PSA layer formed from a photo-curable PSA composition.

Examples of the polyfunctional monomer include ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, pentaerythritol tri(meth)acrylate, dipentaerythritol hexa(meth)acrylate, ethyleneglycol di(meth)acrylate, 1,6-hexanediol di(meth)acrylate, 1,12-dodecanediol di(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, butyldiol (meth)acrylate and hexyldiol di(meth)acrylate. Among them, trimethylolpropane tri(meth)acrylate, 1,6-hexanediol di(meth)acrylate and dipentaerythritol hexa(meth)acrylate can be favorably used. For the polyfunctional monomer, solely one species or a combination of two or more species can be used.

The amount of polyfunctional monomer used depends on its molecular weight, the number of functional groups therein, etc.; it is usually suitably in a range of about 0.01 part to 3.0 parts by weight to 100 parts by weight of the acrylic polymer. In some embodiments, the amount of polyfunctional monomer used to 100 parts by weight of the acrylic polymer can be, for instance, 0.02 part by weight or greater, 0.1 part by weight or greater, 0.5 part by weight or greater, 1.0 part by weight or greater, or even 2.0 parts by weight or greater. With increasing amount of polyfunctional monomer used, a higher cohesive strength tends to be obtained. On the other hand, from the standpoint of avoiding a decrease in adhesiveness between the PSA layer and the adjacent layer caused by an excessive increase in cohesive strength, the amount of polyfunctional monomer used to 100 parts by weight of the acrylic polymer can be, for instance, 10 parts by weight or less, 5.0 parts by weight or less, or even 3.0 parts by weight or less.

(Acrylic Oligomer)

From the standpoint of increasing the cohesive strength, enhancing the adhesion to the surface (e.g. a surface of the support, etc.) adjacent to the PSA layer, etc., an acrylic oligomer can be added to the PSA composition (and further the PSA layer) disclosed herein. As the acrylic oligomer, it is preferable to use a polymer having a higher Tg than the Tg of the acrylic polymer.

The acrylic oligomer's Tg is not particularly limited. It can be, for instance, about 20° C. or higher and 300° C. or lower. The Tg can also be, for instance, about 30° C. or higher, about 40° C. or higher, about 60° C. or higher, about 80° C. or higher, or even about 100° C. or higher. With increasing acrylic oligomer's Tg, the effect to increase the cohesive strength generally tends to improve. From the standpoint of the anchoring properties to the support, impact absorption, etc., the acrylic oligomer's Tg can be, for instance, about 250° C. or lower, about 200° C. or lower, about 180° C. or lower, or even about 150° C. or lower. Similar to the acrylic polymer's Tg corresponding to the monomer composition, the acrylic oligomer's Tg value is determined by the Fox equation.

The acrylic oligomer may have a Mw of typically about 1000 or higher and lower than about 30000, preferably about 1500 or higher and lower than about 10000, or yet more preferably about 2000 or higher and lower than about 5000. With the Mw in these ranges, favorable effect is likely to be obtained to enhance the cohesion and the adhesion to the adjacent surface. The acrylic oligomer's Mw can be measured by gel permeation chromatography (GPC) and determined based on standard polystyrene. Specifically, it is measured at a flow rate of about 0.5 mL/min, using two TSKgelGMH-H (20) columns as columns and tetrahydrofuran solvent on HPLC 8020 available from Tosoh Corporation.

Examples of the monomers forming the acrylic oligomer include (meth)acrylate monomers such as the aforementioned various $C_{1-20}$ alkyl (meth)acrylates; the aforementioned various alicyclic hydrocarbon group-containing (meth)acrylates; the aforementioned various aromatic hydrocarbon group-containing (meth)acrylates; and (meth)acrylates obtained from terpene-derived alcohols. These can be used solely as one species or in a combination of two or more species.

From the standpoint of enhancing the adhesion, the acrylic oligomer preferably includes, as a monomeric unit, an acrylic monomer having a relatively bulky structure, typified by an alkyl (meth)acrylate whose alkyl group has a branched structure such as isobutyl (meth)acrylate and t-butyl (meth) acrylate; an alicyclic hydrocarbon group-containing (meth) acrylate; and an aromatic hydrocarbon group-containing (meth)acrylate. When UV rays are used for the synthesis of the acrylic oligomer or for the preparation of the PSA layer, for being less likely to inhibit the polymerization, a monomer having a saturated hydrocarbon group at the ester terminus is preferable. For instance, an alkyl (meth)acrylate whose alkyl group has a branched structure and a saturated alicyclic hydrocarbon group-containing (meth)acrylate can be favorably used.

The ratio of (meth)acrylate monomer in the entire monomers forming the acrylic oligomer is typically above 50% by weight, preferably 60% by weight or higher, or more preferably 70% by weight or higher (e.g. 80% by weight or higher, or even 90% by weight or higher). In a preferable embodiment, the acrylic oligomer has a monomer composition essentially consisting of one, two or more species of (meth)acrylate monomer. When the monomers include an alicyclic hydrocarbon group-containing (meth)acrylate and a $C_{1-20}$ alkyl (meth)acrylate, their weight ratio is not particularly limited. For instance, it can be in ranges between 10/90 and 90/10, between 20/80 and 80/20, between 70/30 and 30/70, etc.

As the acrylic oligomer-forming monomers, in addition to the (meth)acrylate monomer described above, a functional group-containing monomer can be used as necessary. Examples of the functional group-containing monomer include monomers having nitrogen atom-containing heterocyclic rings such as N-vinyl-2-pyrrolidone and N-acryloylmorpholine; amino group-containing monomers such as N,N-dimethylaminoethyl (meth)acrylate; amide group-containing monomers such as N,N-diethyl (meth)acrylamide; carboxy group-containing monomers such as AA and MAA; and hydroxy group-containing monomers such as 2-hydroxyethyl (meth)acrylate. These functional group-containing monomers can be used solely as one species or in a combination of two or more species. When a functional group-containing monomer is used, the ratio of the functional group-containing monomer in the entire monomers forming the acrylic oligomer can be, for instance, 1% by weight or greater, 2% by weight or greater, or 3% by weight or greater. It can also be, for instance, 15% by weight or less, 10% by weight or less, or 7% by weight or less.

Examples of favorable acrylic oligomers include homopolymers of various monomers such as dicyclopentanyl methacrylate (DCPMA), cyclohexyl methacrylate (CHMA), isobornyl methacrylate (IBXMA), isobornyl acrylate (IBXA), dicyclopentanyl acrylate (DCPA), 1-adamantyl methacrylate (ADMA) and 1-adamantyl acrylate (ADA) as well as a copolymer of DCPMA and MMA, copolymer of DCPMA and IBXMA, copolymer of ADA and methyl methacrylate (MMA), copolymer of CHMA and isobutyl methacrylate (IBMA), copolymer of CHMA and IBXMA, copolymer of CHMA and acryloylmorpholine (ACMO), copolymer of CHMA and diethylacrylamide (DEAA), and copolymer of CHMA and AA.

The acrylic oligomer can be formed by polymerizing its constituent monomers. The polymerization method and the polymerization conditions are not particularly limited. Various heretofore known polymerization methods (e.g. solution polymerization, emulsion polymerization, bulk polymerization, photopolymerization, radiation polymerization, etc.) can be employed under suitable conditions. The types of polymerization initiator (e.g. azo polymerization initiator) that can be used as necessary are essentially the same as those exemplified for the synthesis of the acrylic polymer. The amount of polymerization initiator and the amount of chain transfer agent (e.g. a mercaptan) used optionally are suitably selected based on common technical knowledge so as to obtain a desirable molecular weight. Thus, details are omitted.

When the PSA composition includes an acrylic oligomer, its amount included can be, for instance, 0.01 part by weight or greater to 100 parts by weight of the acrylic polymer. From the standpoint of obtaining greater effect, it may be 0.05 part by weight or greater, or 0.1 part by weight or greater, or even 0.2 part by weight or greater. From the standpoint of the compatibility with the acrylic polymer, etc., the acrylic oligomer content is usually suitably less than 50 parts by weight, preferably less than 30 parts by weight, more preferably 25 parts by weight or less, for instance, possibly 10 parts by weight or less, 5 parts by weight or less, or even 1 part by weight or less.

As necessary, the PSA composition disclosed herein may contain, as optional components, various additives generally used in the field of PSA compositions, such as tackifier resin (e.g. rosin-based, petroleum-based, terpene-based, phenolic and ketone-based tackifier resins, etc.), viscosity-adjusting agent (e.g. thickener), leveling agent, plasticizer, filler, colorant including pigment and dye, etc., stabilizing agent, preservative, anti-aging agent, and so on. With respect to these various additives, those heretofore known can be used according to typical methods. Since these do not particularly characterize the present invention, details are omitted.

The art disclosed herein can provide good adhesive strength without using the tackifier resin; and therefore, the tackifier resin content of the PSA composition can be, for instance, below 10 parts by weight or even below 5 parts by weight to 100 parts by weight of the acrylic polymer. The tackifier resin content can also be below 1 part by weight (e.g. below 0.5 part by weight), below 0.1 part by weight (0 part by weight or greater below 0.1 part by weight). The PSA composition may be free of a tackifier resin.

As the PSA composition disclosed herein can be used for optical applications, it may have certain optical properties (e.g. transparency) even after forming a PSA layer. From the standpoint of such optical properties, it is preferable to limit the amounts of other components in the PSA composition besides the acrylic polymer. In the art disclosed herein, the amounts of non-acrylic-polymer components in the PSA composition is typically about 30% by weight or less, suitably about 15% by weight or less, or preferably about 12% by weight or less (e.g. about 10% by weight or less). The amounts of non-acrylic-polymer components in the PSA composition according to an embodiment can be about 5% by weight or less, about 3% by weight or less, or even about 1.5% by weight or less (e.g. about 1% by weight or less). The composition having a limited non-acrylic-polymer content can be preferably employed for the photocurable PSA composition.

Constitutional Examples of PSA Sheet

Described next is the PSA sheet disclosed herein. The PSA sheet in the art disclosed herein has a PSA layer formed from a PSA composition. FIG. 1 shows a constitutional example of the PSA sheet disclosed herein. PSA sheet 1 is formed as an adhesively single-faced PSA sheet comprising a PSA layer 10 whose first surface 10A is a face (adhesive face) adhered to an adherend, and a support 20 laminated on the second surface 10B of PSA layer 10. PSA layer 10 is permanently bonded to a first face 20A of support 20. As support 20, for instance, plastic film such as polyester film can be used. In the example shown in FIG. 1, PSA layer 10 has a monolayer structure. In other words, the entire PSA layer 10 is formed of the layer A forming the first surface (adhesive face) 10A of PSA layer 10. PSA sheet 1 is used by applying the first surface 10A to the polarizing plate as adherend. PSA sheet 1 prior to use (before applied to adherend) may have, for instance as shown in FIG. 1, a form of release-linered PSA sheet 50 in which adhesive face 10A is protected with release liner 30 having a releasable surface (release face) at least on the PSA layer side. Alternatively, it may be in an embodiment where it is wound or layered so that the second face 20B (the reverse side of the first face 20A, or the backside) of support 20 as a release face makes contact with and protects adhesive face 10A.

As for the release liner, no particular limitations are imposed. For example, it is possible to use a release liner in which a surface of a liner substrate such as resin film or paper is release-treated, or a release liner formed from a low adhesive material such as fluorine-based polymer (polytetrafluoroethylene, etc.) and polyolefin-based resin (polyethylene, polypropylene, etc.). For the release treatment, for instance, a release agent such as silicone-based and long-chain alkyl-based release agents can be used. In some embodiments, release-treated resin film can be preferably used as the release liner.

The PSA layer of the PSA sheet disclosed herein is not limited to a monolayer structure as the constitutional examples. In addition to the PSA layer (typically a compound A-containing PSA layer), it may have one, two or more PSA layers (additional PSA layers) having the same or different compositions. Each layer of the one, two or more additionally-placed PSA layers may include or may be free of the compound A. When an additional PSA layer is placed on the support side relative to the PSA layer, from the standpoint of combining good reworkability and high peel strength, the additional PSA layer may include or may be free of a peel strength enhancer.

Figure 2:
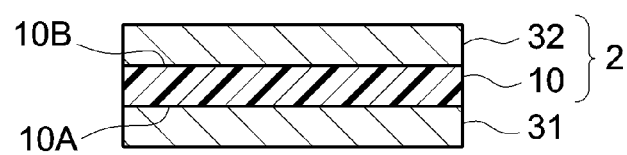
FIG. 2 shows a cross-sectional diagram schematically illustrating the PSA sheet according to another embodiment.

The PSA sheet disclosed herein can be in a form of a supportless adhesively double-faced PSA sheet. As shown in FIG. 2, supportless double-faced PSA sheet 2 prior to use may be in an embodiment where the respective faces 10A and 10B of a PSA layer 10 are protected with release liners 31 and 32 each having a releasable surface (release face) at least on the PSA layer side. Alternatively, it may be in an embodiment where it is wound or layered so that the backside (the surface on the reverse side of the PSA layer side) of release liner 31 as a release face makes contact with adhesive face 10B, whereby adhesive faces 10A and 10B are protected. Such a supportless double-faced PSA sheet can be used, for instance, by attaching a support to either face of the PSA layer.

Figure 3:
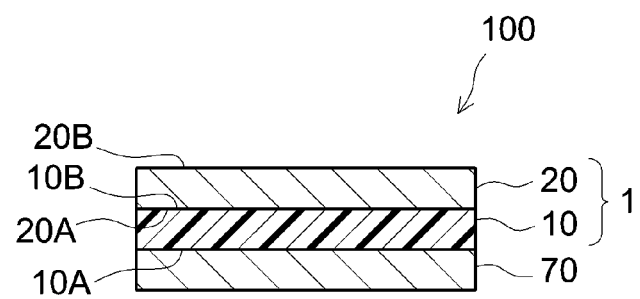
FIG. 3 shows a cross-sectional diagram schematically illustrating a PSA sheet-bearing optical member wherein the PSA sheet according to an embodiment is adhered to an optical member.

The PSA sheet disclosed herein can be a component of a PSA sheet-bearing optical member where the optical member is attached to one face of the PSA layer. For instance, as shown in FIG. 3, PSA sheet 1 shown in FIG. 1 can be a component of PSA sheet-bearing optical member 100 where optical member 70 is attached to one surface 10A of PSA layer 10. In a preferable optical member, the face to which the PSA sheet is adhered has a non-water-absorbing smooth surface. The PSA sheet-bearing optical member having such a constitution facilitates reworking by applying the water peel method described later as necessary when applying the PSA sheet to the optical member. The optical member can be, for instance, a glass substrate, resin film, metal plate, etc. Of the member, the face applied to the PSA sheet may be subjected to hydrophilicity enhancing treatment. Examples of the hydrophilicity enhancing treatment include treatment that contributes to an increase in hydrophilicity, such as corona treatment, plasma treatment, and hydrophilic coating by which a hydrophilic coating layer is provided.

<PSA Layer>

The PSA sheet disclosed herein may have a PSA layer formed from the PSA composition disclosed herein. The PSA layer constituting the PSA sheet may be a cured layer of the PSA composition. In other words, the PSA layer can be formed by providing (e.g. applying) the PSA composition to a suitable surface and then subjecting it to a suitable curing process. When two or more different curing processes (drying, crosslinking, polymerization, etc.) are carried out, these can be done at the same time or in stages.

When a partial polymer (acrylic polymer syrup) of the monomers is used for the PSA composition, a final copolymerization reaction is typically carried out as the curing process. That is, the partial polymer is subjected to a further copolymerization reaction to form a fully polymerized product. For instance, when drying is necessary with a photocurable PSA composition (e.g. in case of a photocurable PSA composition in a form of partial polymer of monomers dissolved in an organic solvent), photoirradiation can be carried out after the composition is allowed to dry.

With respect to a PSA composition using a fully polymerized product, processes such as drying (drying with heat) and crosslinking are typically carried out as necessary as the curing process. As for a solvent-based PSA composition provided with photocuring properties (photo-crosslinking properties) by addition of a polyfunctional monomer, photocuring can be carried out after the composition is allowed to dry, possibly after the PSA sheet obtained after the drying is applied to an adherend. The PSA sheet disclosed herein can be used in an embodiment where it is applied to an adhered by a method that includes photocuring after it is applied to the adherend.

The PSA layer having a multilayer structure with two or more layers can be prepared by adhering pre-formed PSA layers together. Alternatively, it can be prepared by applying a PSA composition can be applied onto a pre-formed first PSA layer and allowed to cure to form a second PSA layer. When the PSA layer has a multilayer structure in the PSA sheet used in the embodiment where photocuring is carried out after it is applied to the adherend, the PSA layer to be photocured can be a particular layer (e.g. a single layer) or all layers of the multilayer structure.

The PSA composition can be applied with, for example, a conventional coater such as a gravure roll coater, a reverse roll coater, a kiss-roll coater, a dip roll coater, a bar coater, a knife coater and a spray coater. With respect to a PSA sheet having a support, as the method for providing a PSA layer onto the support, it is possible to use a direct method where the PSA composition is directly provided to the support or a transfer method where a PSA layer formed on a release face is transferred to the support.

The thickness of the PSA layer is not particularly limited. It can be, for instance, about 3 μm to 2000 μm. From the standpoint of the conformability to contours and the tightness of adhesion to adherend, in some embodiments, the thickness of the PSA layer is, for instance, possibly 5 μm or greater, suitably 10 μm or greater, preferably 20 μm or greater, or more preferably 30 μm or greater. The thickness of the PSA layer can also be 50 μm or greater, greater than 50 μm, 70 μm or greater, 100 μm or greater, or even 120 μm or greater. From the standpoint of preventing the occurrence of leftover adhesive residue due to cohesive failure of the PSA layer, in some embodiments, the thickness of the PSA layer can be, for instance, 1000 μm or less, 700 μm or less, 500 μm or less, 300 μm or less, even 200 μm or less, or 170 μm or less. The art disclosed herein can also be favorably implemented in an embodiment of a PSA sheet whose PSA layer has a thickness of possibly 130 μm or less, 90 μm or less, or 60 μm or less (e.g. 40 μm or less). It is noted that in a PSA sheet that has a PSA layer having a multilayer structure with two or more layers, the thickness of the PSA layer refers to the thickness from the adhesive face to be adhered to the adherend through the reverse side of the adhesive face.

<Support>

The PSA sheet peeled by the peeling method disclosed herein may be in a form of on-support PSA sheet including a support bonded to the other surface of the PSA layer. The material of support is not particularly limited and can be suitably selected in accordance with the purpose and application of the PSA sheet. Non-limiting examples of the support that may be used include plastic films including a polyolefin film whose primary component is a polyolefin such as polypropylene and ethylene-propylene copolymer, a polyester film whose primary component is polyester such as polyethylene terephthalate and polybutylene terephthalate, and a polyvinyl chloride film whose primary component is polyvinyl chloride; a foam sheet formed of a foam such as polyurethane foam, polyethylene foam and polychloroprene foam; woven and nonwoven fabrics of single or blended spinning of various fibrous materials (which may be natural fibers such as hemp and cotton, synthetic fibers such as polyester and vinylon, semi-synthetic fibers such as acetate, etc.); paper such as Japanese paper, high-quality paper, kraft paper and crepe paper; and metal foil such as aluminum foil and copper foil. The support may be formed of a composite of these materials. Examples of the support having such a composite structure include a support having a layered structure of metal foil and plastic film, and a plastic sheet reinforced with inorganic fibers such as glass cloth.

As the support of the PSA sheet disclosed herein, various kinds of film (or support film, hereinafter) can be preferably used. The support film can be a porous film such as a foam film and a non-woven fabric sheet, a non-porous film, or a film having a layered structure of porous and non-porous layers. In some embodiment, a preferable support film comprises a resin film capable of independently holding its shape (standing by itself or independently) as the base film. The "resin film" here means a resin film having a non-porous structure and is typically substantially free of air bubbles (void-less). Thus, the concept of resin film is distinct from foam films and non-woven fabrics. The resin film may have a monolayer structure or a multilayer structure with two or more layers (e.g. a three-layer structure).

Examples of the resin material forming the resin film include resins such as polyester; polyolefin; polycycloolefin derived from a monomer having an aliphatic ring structure such as a norbornene structure; polyamide (PA) such as nylon 6, nylon 66 and partially aromatic polyamide; polyimide (PI); polyamide-imide (PAI); polyether ether ketone (PEEK); polyether sulfone (PES); polyphenylene sulfide (PPS); polycarbonate (PC); polyurethane (PU); ethylene-vinyl acetate copolymers (EVA); polystyrene; polyvinyl chloride; polyvinylidene chloride; fluororesin such as polytetrafluoroethylene (PTFE); acrylic resin such as polymethyl methacrylate; cellulose-based polymer such as diacetyl cellulose and triacetyl cellulose; vinyl butyral-based polymer; arylate-based polymer; polyoxymethylene-based polymer; and epoxy-based polymer. The resin film may be formed from a resin material containing one species of such resin alone or a resin material in which two or more species are blended. The resin film may be formed using a resin material comprising solely one species among these resins or using a resin material in which two or more species are blended. The resin film may be non-stretched or stretched (e.g. uniaxially stretched or biaxially stretched).

Favorable examples of the resin material forming the resin film include polyester resins, PPS resins and polyolefin resins. Here, the polyester resin refers to a resin containing more than 50% polyester by weight. Similarly, the PPS resin refers to a resin containing more than 50% PPS by weight and the polyolefin resin refers to a resin containing more than 50% polyolefin by weight.

As the polyester resin, it is typical to use a polyester-based resin whose primary component is a polyester obtainable by polycondensation of a dicarboxylic acid and a diol. Specific examples of the polyester resin include polyethylene terephthalate (PET), polybutylene terephthalate (PBT), polyethylene naphthalate (PEN), and polybutylene naphthalate.

As the polyolefin resin, solely one species of polyolefin or a combination of two or more species of polyolefin can be used. Examples of the polyolefin include an α-olefin homopolymer, a copolymer of two or more species of α-olefin, and a copolymer of one, two or more species of α-olefin and another vinyl monomer. Specific examples include polyethylene (PE), polypropylene (PP), poly-1-butene, poly-4-methyl-1-pentene, ethylene-propylene copolymers such as ethylene-propylene rubber (EPR), ethylene-propylene-butene copolymers, ethylene-butene copolymers, ethylene-vinyl alcohol copolymers and ethylene-ethyl acrylate copolymers. Either a low-density (LD) polyolefin or a high-density (HD) polyolefin can be used. Examples of the polyolefin resin include non-stretched polypropylene (CPP) film, biaxially-stretched polypropylene (OPP) film, low-density polyethylene (LDPE) film, linear low-density polyethylene (LLDPE) film, medium-density polyethylene (MDPE) film, high-density polyethylene (HDPE) film, polyethylene (PE) film in which two or more species of polyethylene (PE) are blended, PP/PE blend film in which polypropylene (PP) and polyethylene (PE) are blended.

Specific examples of the resin film that may be preferably used as the support include PET film, PEN film, PPS film, PEEK film, CPP film and OPP film. Preferable examples in view of the strength include PET film, PEN film, PPS film and PEEK film. From the standpoint of the availability size stability, optical properties, etc., a preferable example is PET film.

The resin film may include, as necessary, known additives such as photo stabilizer, antioxidant, antistatic agent, colorant (dye, pigment, etc.), fillers, slip agent and anti-blocking agent. The amount of an additive is not particularly limited and can be suitably selected according to the application of the PSA sheet, etc.

The method for producing the resin film is not particularly limited. For instance, heretofore known general resin film formation methods can be suitably employed, such as extrusion molding, inflation molding, T-die casting and calendar rolling.

The support may be substantially formed from such resin film. Alternatively, the support may include a secondary layer in addition to the resin film. Examples of the secondary layer include a layer for adjusting optical properties (such as a colored layer and an antireflection layer), a print layer and laminate layer to provide a desirable appearance to the support or to the PSA sheet, a treated surface layer such as an antistatic layer, a primer layer, and a release layer. The support can also be an optical member described later.

The thickness of the support is not particularly limited and can be suitably selected in accordance with the purpose and application of the PSA sheet. The support's thickness is usually suitably, for instance, 1000 μm or less, 500 μm or less, 100 μm or less, 70 μm or less, 50 μm or less, 25 μm or less, 10 μm or less, or even 5 μm or less. With decreasing thickness of the support, the PSA sheets flexibility and conformability to surface structures of adherends tend to improve. From the standpoint of the ease of handling, processing and so on, the support's thickness can be, for instance, 2 μm or greater, greater than 5 μm, or even greater than 10 μm. In some embodiments, the support's thickness can be, for instance, 20 μm or greater, 35 μm or greater, or even 55 μm or greater.

Of the support, the face on the side to be bonded to the PSA layer may be subjected as necessary to a heretofore known surface treatment such as corona discharge treatment, plasma treatment, UV irradiation, acid treatment, alkali treatment, primer coating, and antistatic treatment. These surface treatments may increase the tightness of adhesion between the support and the PSA layer, that is, the anchoring of the PSA layer to the support. The composition of the primer is not particularly limited and can be suitably selected among known species. The thickness of the primer layer is not particularly limited and is usually suitably about 0.01 μm to 1 μm, or preferably about 0.1 μm to 1 μm.

Of the support, the backside (or the reverse side of the side to be bonded to the PSA layer) may be subjected as necessary to a heretofore known surface treatment such as release treatment, treatment to enhance bonding or adhesiveness, and antistatic treatment. For instance, by treating the backside of the support with a release agent, the unwinding force of the PSA sheet in a rolled form can be reduced. As the release agent, it is possible to use a silicone-based release agent, long-chain alkyl release agent, olefinic release agent, fluorine-based release agent, aliphatic amide-based release agent and molybdenum sulfide, silica powder and the like.

<Additional PSA Layer>

In the PSA sheet disclosed herein, the PSA layer that can be additionally placed separately from the aforementioned PSA layer (compound A-containing PSA layer) may be formed, comprising one, two or more species of PSA selected among various known kinds of PSA such as acrylic PSA, rubber-based PSA (natural rubber-based, synthetic rubber-based, a mixture of these, etc.), silicone-based PSA, polyester-based PSA, urethane-based PSA, polyether-based PSA, polyamide-based PSA and fluorine-based PSA From the standpoint of the transparency, weatherability, etc., in some embodiments, as the material forming the additional PSA layer, an acrylic PSA can be preferably used. With respect to other features of the additional PSA layer, the same constitution as the aforementioned PSA layer (compound A-containing PSA layer) can be employed or a suitable constitution can be used in accordance with the application and purpose based on known or conventional art and common technical knowledge; and therefore, details are omitted here.

<Properties of PSA Sheet>

The PSA sheet disclosed herein may have a normal peel strength of about 1.5 N/cm or greater after 30 minutes at 23° C., determined by the method described later in Examples. The 23° C.—30 min normal peel strength is suitably about 2 N/cm or greater. From the standpoint of obtaining good adhesive strength, it is preferably about 3 N/cm or greater, or more preferably about 3.5 N/cm or greater (e.g. about 4 N/cm or greater). For instance, the PSA sheet according to an embodiment may show a 23° C.•30 min normal peel strength of about 5 N/cm or greater. In this embodiment, the 23° C.•30 min normal peel strength is preferably about 9 N/cm or greater, more preferably about 10 N/cm or greater, yet more preferably about 11 N/cm or greater, or particularly preferably about 12 N/cm or greater (e.g. about 13 N/cm or greater). Such strong adhesive strength can be preferably obtained with the use of a solvent-based or photocurable PSA composition. The maximum 23° C.•30 min normal peel strength is not particularly limited. It can be, for instance, 25 N/cm or less, 20 N/cm or less, 15 N/cm or less, or even 10 N/cm or less.

The PSA sheet disclosed herein may have a water-peel strength of less than about 1.3 N/cm after 30 minutes at 23° C., determined by the method described later in Examples. The 23° C.•30 min water-peel strength is suitably about 1 N/cm or less. From the standpoint of the ease of reworking by water peel, it is preferably below 1 N/cm, for instance, below 0.7 N/cm, or possibly below 0.3 N/cm (about 0.1 N/cm or less).

The PSA sheet disclosed herein may have a normal peel strength of about 3 N/cm or greater (e.g. about 4 N/cm or greater) after 18 hours at 60° C., determined by the method described later in Examples. The 60° C.•18 h normal peel strength is suitably about 5 N/cm or greater. From the standpoint of obtaining sufficient adhesive strength, it is preferably about 7 N/cm or greater (e.g. about 8 N/cm or greater). For instance, the PSA sheet according to an embodiment may show a 60° C.•18 h normal peel strength of about 10 N/cm or greater. In this embodiment, the 60° C.•18 h normal peel strength is preferably about 12 N/cm or greater, or more preferably about 14 N/cm or greater (e.g. about 15 N/cm or greater). The maximum 60° C.•18 h normal peel strength is not particularly limited. It can be, for instance, 25 N/cm or less, 20 N/cm or less, 18 N/cm or less, or even 12 N/cm or less.

The PSA sheet disclosed herein may have a water-peel strength of less than about 1.3 N/cm after 18 hours at 60° C., determined by the method described later in Examples. The 60° C.•18 h water-peel strength is suitably about 1 N/cm or less. From the standpoint of the ease of reworking by water peel, it is preferably below 1 N/cm, for instance, below 0.7

N/cm, or possibly below 0.3 N/cm (about 0.1 N/cm or less). In another embodiment, the 60° C.•18 h water-peel strength can be about 4 N/cm or greater. In this embodiment, the 60° C.•18 h water-peel strength can be about 5 N/cm or greater, or even about 6 N/cm or greater (e.g. about 7 N/cm or greater). With the PSA sheet showing such a 60° C.•18 h water-peel strength, by carrying out a certain curing process (typically heating), the water-peeling properties are lost; and therefore, good bonding reliability (reliable water resistance) can be obtained even in an environment exposed to water and the like. The maximum 60° C.•18 h water-peel strength is not particularly limited. It can be, for instance, 25 N/cm or less, 20 N/cm or less, or even 12 N/cm or less.

The PSA sheet according to a preferable embodiment may have a water-peel adhesive strength reduction rate A of about 40% or higher (e.g. about 50% or higher), determined from the ratio (FW1/FN1) of the 23° C.•30 min water-peel strength FW1 to the 23° C.•30 min normal peel strength FN1. The PSA sheet having a high water-peel adhesive strength reduction rate A can be peeled using an aqueous liquid such as water to significantly reduce the load applied to the adherend during the peel. For instance, supply a small amount of aqueous liquid to the adherend with the PSA sheet adhered thereto, allow the aqueous liquid to enter the interface between the PSA sheet and the adherend at one edge of the PSA sheet to provide a trigger for peeling, and then peel the PSA sheet. By this, the peel strength of the PSA sheet to the adherend can be greatly reduced. This property helps combine properties to reduce displacement and lifting of the PSA sheet adhered to the adherend and good reworkability. In some embodiments, the water-peel adhesive strength reduction rate A is, for instance, suitably 60% or higher, preferably 65% or higher, for instance, possibly 70% or higher, 75% or higher, 80% or higher, or even 85% or higher. In the PSA sheet according to an embodiment, the water-peel adhesive strength reduction rate A is 90% or higher, for instance, possibly 95% or higher, or even 98% or higher (typically 99% or higher). The water-peel adhesive strength reduction rate A is theoretically 100% or lower and typically below 100%.

The water-peel adhesive strength reduction rate A can be determined by the equation:

$$\text{Water-peel adhesive strength reduction rate } A(\%) = (1-(FW1/FN1)) \times 100$$

The PSA sheet according to an embodiment has a peel strength increase rate of about 20% or higher, determined from the relationship between the 23° C.•30 min normal peel strength FN1 and the 60° C.•18 h normal peel strength FN2. The peel strength increase rate can be, for instance, 30% or higher, or even 40% or higher. In some embodiments, the peel strength increase rate can be, for instance, 100% or higher, 150% or higher, or even 200% or higher. Such a peel strength increase rate can be preferably selected for a constitution having a relatively low initial peel strength. The maximum peel strength increase rate is not particularly limited. It can be, for instance, 1000% or lower. In other embodiments, the peel strength increase rate is possibly about 100% or lower, or suitably about 50% or lower. The PSA sheet having a reduced peel strength increase rate is likely to provide stable adhesive strength while adhered to the adherend and may have excellent bonding stability such as being less likely to cause an excessive increase in adhesive strength in a usage environment to which the PSA sheet is potentially exposed. The peel strength increase rate can be about 40% or lower, or even about 30% or lower. In this embodiment, the minimum peel strength increase rate is not particularly limited. It can be about 0% or higher, or about 10% or higher (e.g. about 15% or higher).

The peel strength increase rate can be determined by the equation:

$$\text{Peel strength increase rate } (\%) = ((FN2-FN1)/FN1) \times 100;$$

The PSA sheet according to an embodiment may have a post-heat water-peel adhesive strength reduction rate of about 70% or higher, determined from the ratio (FW2/FN2) of the 60° C.•18 h water-peel strength FW2 to the 60° C.•18 h normal peel strength FN2. The PSA sheet having a high post-heat water-peel adhesive strength reduction rate has sufficient adhesive strength as well as excellent water-peeling properties using an aqueous liquid such as water after heated; and therefore, even after a heating process, good reworkability can be obtained. The post-heat water-peel adhesive strength reduction rate is suitably 80% or higher, for instance, possibly 90% or higher, 95% or higher, or even 98% or higher (typically 99% or higher). In another embodiment, the post-heat water-peel adhesive strength reduction rate can be 40% or lower. With the PSA sheet having a low post-heat water-peel adhesive strength reduction rate, it will be difficult to water-peel the PSA sheet after the heating process, whereby bonding with reliable water resistance can be obtained. In this embodiment, the post-heat water-peel adhesive strength reduction rate can be, for instance, 30% or lower, or even 20% or lower. The post-heat water-peel adhesive strength reduction rate is theoretically 100% or lower and typically below 100%.

The post-heat water-peel adhesive strength reduction rate can be determined by the equation:

$$\text{Post-heat water-peel adhesive strength reduction rate } (\%) = (1-(FW2/FN2)) \times 100$$

In the art disclosed herein, the haze value of the PSA sheet is suitably about 10% or lower, or possibly about 5% or lower (e.g. about 3% or lower). The haze value is preferably 1.0% or lower. Such a highly transparent PSA sheet is suitable for optical applications requiring high optical transparency. The PSA sheet's haze value can be below 1.0%, below 0.7%, or even 0.5% or lower (e.g. 0 to 0.5%). These haze values with regard to the PSA sheet can also be preferably applied to the haze value of the PSA layer in the art disclosed herein.

Here, the "haze value" refers to the ratio of diffused light transmittance to total light transmittance when the analytical sample is irradiated with visible light. It is also called the cloudiness value. The haze value can be expressed by the equation below.

$$Th(\%) = Td/Tt \times 100$$

In the equation, Th is the haze value (%), Td is the diffused light transmittance, and Tt is the total light transmittance. The haze value can be determined according to the method described later in Examples. The haze value can be adjusted by selecting, for instance, certain composition, thickness and so on for the PSA layer.

From the standpoint of the bonding reliability, the PSA sheet disclosed herein preferably has a normal adhesive strength N0 of 2.0 N/10 mm or greater. In some embodiments, the normal adhesive strength N0 can be, for instance, 2.5 N/10 mm or greater, 3.0 N/10 mm or greater, 3.5 N/10 mm or greater, or even 4.0 N/10 mm or greater. The maximum normal adhesive strength N0 is not particularly limited. For instance, it can be 30 N/10 mm or less. In some embodiments, the normal adhesive strength N0 can be 20

N/10 mm or less, or even 15 N/10 mm or less. The normal adhesive strength N0 is determined by the method described later in Examples.

The water-peel strength N2 is preferably up to 60% (more preferably up to 50%) of the normal adhesive strength N0. While no particular limitations are imposed, the water-peel strength N2 can be, for instance, 10 N/10 mm or less, 3.5 N/10 mm or less, 3.0 N/10 mm or less, 2.5 N/10 mm or less, 1.6 N/10 mm or less, 1.2 N/10 mm or less, or even 1.0 N/10 mm or less. According to the PSA sheet having a low water-peel strength N2, it is possible to reduce the load applied to the adherend when peeling the PSA sheet. This is particularly significant in the PSA sheet applied to, for instance, a thin adherend, a fragile adherend, an adherend susceptible to deformation (elongating, warping, twisting, etc.), an adherend having a thin surface layer susceptible to damage, and the like. The PSA sheet disclosed herein can be also made in an embodiment where the water-peel strength N2 is, for instance, 0.75 N/10 mm or less, 0.50 N/10 mm or less, 0.25 N/10 mm or less, or even 0.15 N/10 mm or less. The minimum water-peel strength N2 is not particularly limited. It can be essentially 0 N/10 mm, or greater than 0 N/10 mm.

From the standpoint of enhancing the reworkability, in the measurement of water-peel strength N2, it is preferable that the PSA sheet peels from the adherend without leaving the PSA on the adherend. That is, the PSA sheet preferably has excellent anti-residue properties. The presence or absence of residual PSA left on the adherend can be determined, for instance, by visually observing the adherend after the PSA sheet is peeled.

The water-peel strength N2 is determined by the method described later in Examples.

The ratio (N2/N0) of the water-peel strength N2 (N/10 mm) to the normal adhesive strength N0 (N/10 mm) can be, for instance, 1/2.5 or less, 1/5 or less, or even 1/10 or less. A smaller N2/N0 ratio means a more significant decrease in water-peel strength N2 relative to the normal adhesive strength N0. The PSA sheet disclosed herein can be preferably made in an embodiment in which the N2/N0 ratio is 1/15 or less, 1/25 or less, or 1/35 or less. The maximum N2/N0 ratio value is not particularly limited. For instance, it can be 1/200 or greater, 1/150 or greater, or even 1/100 or greater.

The PSA disclosed herein preferably has a water-peel adhesive strength reduction rate B of 40% or higher. A PSA sheet having a large water-peel adhesive strength reduction rate B can be easily peeled using an aqueous liquid such as water. For instance, supply a small amount of aqueous liquid to the adherend with the PSA sheet adhered thereto, allow the aqueous liquid to enter the interface between the PSA sheet and the adherend at one edge of the PSA sheet to provide a trigger for peeling, and then peel the PSA sheet. By this, the peel strength of the PSA sheet to the adherend can be greatly reduced. This property helps combine high adhesive strength and good reworkability for normal use. In some embodiments, the water-peel adhesive strength reduction rate B may be, for instance, 50% or higher, 65% or higher, 75% or higher, 85% or higher, 90% or higher, 95% or higher, or even 97% or higher. The water-peel adhesive strength reduction rate B is theoretically 100% or lower and typically below 100%.

The water-peel adhesive strength reduction rate B can be determined by the equation:

$$\text{Water-peel adhesive strength reduction rate } B(\%) = (1-(N2/N0)) \times 100$$

In the equation, N0 is the normal peel strength N0 (N/10 mm) and N2 is the water-peel strength N2 (N/10 mm).

<Applications>

The application of the PSA sheet disclosed herein is not particularly limited and it can be used in various applications. For instance, for the features combining good reworkability by water peel and sufficient adhesive strength without impairing the adherend's optical properties, it can be used in an embodiment where it is applied to members constituting various portable devices, automobiles, home electric appliance and the like, for purposes such as fixing, bonding, shaping, decorating, protecting, and supporting these optical members. At least the material forming the surface of the optical member can be, for instance, glass such as an alkaline glass or non-alkaline glass; resin film; metals such as stainless steel (SUS) and aluminum; ceramic materials such as alumina and silica; resin materials such as acrylic resin, ABS resin, polycarbonate resin, polystyrene resin and transparent polyimide resin. The PSA sheet disclosed herein can be applied to a surface coated with an acrylic paint or a paint based on polyester, alkyd, melamine, urethane, acid/epoxy crosslinking, or their composite (e.g. acrylic melamine paint, alkyd melamine paint); or it can also be applied to a plated surface such as a galvanized steel sheet. Favorable examples of the adherend include inorganic materials such as the glass, ceramic materials and metals. The PSA sheet disclosed herein can be, for instance, a component of a PSA sheet-bearing optical member that comprises the PSA sheet and an optical member whose surface is at least partially formed of such a material, wherein the adhesive face of the PSA sheet is bonded to the surface of the optical member.

The optical application in the art disclosed herein can be, for instance, bonding optical members (for optical member bonding) or manufacturing a product (optical product) in which the optical members are used. The PSA sheet disclosed herein can be preferably used as an optical PSA sheet used for these applications.

The optical member refers to a member having optical properties (e.g. polarizability, light refractivity, light scattering properties, light reflectivity, light transmission, light absorption, light diffraction, optical rotation, visibility, etc.). The optical member is not particularly limited as long as it has optical properties. Examples include components of a device (optical device) such as a display device (an image display unit) and an input device as well as a member used for these devices, for instance, a polarizing plate, waveplate, retardation plate, optical compensation film, glaring film, light guide plate, reflective film, anti-reflection film, hard coat (HC) film, impact-absorbing film, anti-fouling film, photochromic film, light control film, transparent conductive film (ITO film), design film, decorative film, surface protection plate, prism, lens, color filter, transparent substrate, and laminates of these (or collectively referred to as "functional films"). The "plate" and "film" individually encompass forms of plate, film, sheet, etc. For instance, the "polarizing film" encompasses a "polarizing plate", "polarizing sheet" and the like.

Examples of the display device include a liquid crystal display device, organic EL (electroluminescence) display device, PDP (plasma display panel), and electronic paper. The art disclosed herein is preferably applied, especially when an expensive member is included, such as a foldable display device and a display device installed in a vehicle. Examples of the input device include a touch panel.

While no particular limitations are imposed, examples of the optical member include members (e.g. members in a form of sheets, films or plates) formed of glass, acrylic resin, polycarbonate, polyethylene terephthalate, metal foil, etc. As used herein, the "optical member" includes a member (design film, decoration film, surface protective film, etc.) that serves to provide decoration or protection while maintaining the visibility of a display device or an input device.

There are no particular limitations to how optical members are bonded using the PSA sheet disclosed herein. Examples of a possible embodiment include (1) optical members are bonded to each other via the PSA sheet disclosed herein, (2) an optical member is bonded to a non-optical member via the PSA sheet disclosed herein, and (3) the PSA sheet disclosed herein is in an embodiment including an optical member and is bonded to an optical or non-optical member. In the embodiment (3), the optical member-containing PSA sheet can be, for instance, a PSA sheet whose support is the optical member (e.g. optical film). Such a PSA sheet including an optical member as the support can be thought as an adhesive optical member (e.g. adhesive optical film). When the PSA sheet disclosed herein has a support and the functional film is used as the support, the PSA sheet can also be thought as "adhesive functional film" having the PSA layer disclosed herein on at least one face of the functional film.

<Peeling Method>

This Description provides a method for peeling a PSA sheet adhered to an adherend from the adherend. The peeling method include a water-peel step in which the PSA sheet is peeled from the adherend, in a state where an aqueous liquid exits at the interface between the adherend and the PSA sheet at the front line of peeling the PSA sheet from the adherend, with the aqueous liquid allowed to further enter the interface following the movement of the peel front line. Here, the peel front line refers to where the PSA sheet starts to separate from the adherend. According to the water peel step, the PSA sheet can be peeled from the adherend with effective use of the aqueous liquid. The peeling method can be preferably practiced, for instance, in an embodiment where a PSA sheet disclosed herein is peeled from an adherend.

As the aqueous liquid used in the peeling method, water or a mixed solvent primarily comprising water with a small amount of an additive as necessary can be used. As for other solvents forming the mixed solvent besides water, a lower alcohol (e.g. ethanol), lower ketone (e.g. acetone) and the like that are miscible with water can be used. As the additives, known surfactants and the like can be used. From the standpoint of avoiding contamination of the adherend, in some embodiments, an aqueous liquid essentially free of additives can be preferably used. From the standpoint of environmental health, it is particularly preferable to use water as the aqueous liquid. The water is not particularly limited. For instance, distilled water, ion-exchanged water, tap water or the like can be used in view of the purity, availability, etc., required for the application.

In some embodiments, similar to the measurement of water-peel strength described later, for instance, the peeling method can be preferably practiced in an embodiment where the aqueous liquid is supplied onto the adherend (near an edge of the PSA sheet adhered to the adherend); and after the aqueous liquid is allowed, through the edge, to enter the interface between the PSA sheet and the adherend, peeling of the PSA sheet is allowed to proceed without another supply of water (i.e. by using only the aqueous liquid supplied onto the adherend before the peel initiation). During the water-peel step, if the water entering the interface between the PSA sheet and the adherend following the movement of the peel front line runs out in the middle of peeling, additional water may be supplied intermittently or continuously after the start of the water-peel step. For instance, when the adherend absorbs water or when the aqueous liquid tends to remain on the post-peel adherend surface or the adhesive face, it may be preferable to employ the embodiment where additional water is supplied after the start of the water-peel step.

The amount of aqueous liquid supplied before the start of peeling is not particularly limited as long as the aqueous liquid can be introduced from the outside of the PSA sheet's bonding area into the interface between the PSA sheet and the adherend. The amount of the aqueous liquid can be, for instance, 5 µL or greater, usually 10 µL or greater, or even 20 µL or greater. There are no particular limitations to the maximum amount of the aqueous liquid. In some embodiments, from the standpoint of facilitating the work, the amount of the aqueous liquid can be, for instance, 10 mL or less, 5 mL or less, 1 mL or less, 0.5 mL or less, 0.1 mL or less, or even 0.05 mL or less. By reducing the amount of the aqueous liquid, it is possible to omit or simplify removal of the aqueous liquid by drying, wiping, etc., after the PSA sheet is peeled off.

At the start of peeling, the procedure for allowing the aqueous liquid to enter the PSA sheet/adherend interface through an edge of the PSA sheet can be carried out, for instance, by ways of inserting the tip of a tool such as cutting knife or needle into the interface at the edge of the PSA sheet; scratching the edge and lifting an end of the PSA sheet with a sort of hook or fingernail; lifting an end of the PSA sheet by sticking a sort of PSA tape or sucker to the PSA sheet's backside near the edge, and so on. By thus forcing the aqueous liquid to enter the interface through the edge of the PSA sheet, it is possible to efficiently form a state having the aqueous liquid at the interface between the adherend and the PSA sheet. Good water-peeling properties following the peel initiation with a procedure of forced entry of the aqueous liquid into the interface to trigger peeling can be favorably combined with highly reliable water resistance obtainable in the absence of such procedure.

The PSA sheet to be peeled by the peeling method includes a PSA layer and the PSA layer is formed with a PSA comprising a compound A. For instance, the PSA sheet is preferably a PSA sheet disclosed herein. Thus, the peeling method is suitable as a method for peeling a PSA sheet disclosed herein.

The water-peel step according to some embodiments can be preferably implemented in an embodiment where the peel front line is allowed to move at a speed of at least 10 mm/min. Moving the peeling front line at a speed of at least 10 mm/min is comparable to peeling the PSA sheet at a tensile speed of at least 20 mm/min, for instance, when the peel angle is 180°. The speed for moving the peeling front line can be, for instance, 25 mm/min or higher, 50 mm/min or higher, 150 mm/min or higher, 300 mm/min or higher, or 500 mm/min or higher. According to the peeling method disclosed herein, the PSA sheet is peeled off from the adherend while allowing the aqueous liquid to enter the interface; and this can bring about good water-peeling properties even at a relatively high peeling speed. The maximum speed at which the peel front line moves is not particularly limited. The speed at which the peel front line moves can be, for instance, 1000 mm/min or lower.

The peeling method disclosed herein can be practiced, for instance, in an embodiment where the peeling area of PSA sheet per 10 μL volume of aqueous liquid (e.g. water) used in the method is, for instance, 50 cm² or larger, or preferably 100 cm² or larger.

The peeling method disclosed herein can be preferably applied to peeling of a PSA sheet adhered to a non-water-absorbing smooth surface such as a glass plate, a metal plate and a resin plate. The peeling method disclosed herein can be preferably employed as a method for peeling a PSA sheet from an aforementioned optical member. In particular, it is suitable as a method for peeling the PSA sheet adhered on a glass plate, such as alkaline glass and non-alkaline glass.

The matters disclosed by this description include the following:

(1) An optical PSA composition comprising an acrylic polymer and further comprising at least one species of compound A selected among surfactants and compounds having polyoxyalkylene backbones.

(2) The PSA composition according to (1) above, wherein the acrylic polymer is formed from monomers comprising less than 20% (by weight) alkoxyalkyl (meth)acrylate and less than 20% (by weight) alkoxypolyalkylene glycol (meth)acrylate.

(3) The PSA composition according to (1) or (2) above, wherein the compound A content is less than 1 part by weight to 100 parts by weight of the acrylic polymer.

(4) The PSA composition according to any of (1) to (3) above, wherein the acrylic polymer has a weight average molecular weight of $40 \times 10^4$ or higher.

(5) The PSA composition according to any of (1) to (4) above, that is an optical PSA composition.

(6) The PSA composition according to any of (1) to (5) above, that is a solvent-based PSA composition or a solvent-free PSA composition.

(7) The PSA composition according to any of (1) to (6) above, wherein the compound A is a nonionic surfactant.

(8) The PSA composition according to any of (1) to (7) above, wherein the compound A has an HLB of 10 or higher.

(9) The PSA composition according to any of (1) to (8) above, wherein the monomers forming the acrylic polymer comprises
an alkyl (meth)acrylate having an alkyl group with 1 to 20 carbon atoms at the ester terminus, and
a monomer having a nitrogen atom (N).

(10) The PSA composition according to (9) above, wherein the N-containing monomer is one, two or more species of monomers selected from the group consisting of cyclic N-vinyl amides represented by the formula (1) and (meth)acrylamides:

[Chem 3]

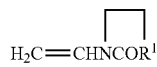
(1)

(In the General Formula (1), $R^1$ is a Divalent Organic Group)

(11) The PSA composition according to any of (1) to (10) above, wherein the acrylic polymer has an SP value of 18.0 $(MJ/m^3)^{1/2}$ to 23.0 $(MJ/m^3)^{1/2}$.

(12) The PSA composition according to any of (1) to (11) above, further comprising a peel strength enhancer.

(13) The PSA composition according to (12) above, wherein the peel strength enhancer is a compound having an alkoxysilyl group.

(14) An optical PSA sheet having a PSA layer formed from the PSA composition according to any of (1) to (13) above.

(15) The PSA sheet according to (14) above, wherein the PSA layer has a thickness of 10 μm or greater and 200 μm or less.

(16) The PSA sheet according to (14) or (15) above, having a normal peel strength FN1 of 3 N/cm or greater, determined at a tensile speed of 60 mm/min at a peel angle of 180° after the adhesive face of the PSA sheet is applied to an adherend and the resultant is left standing at 23° C. for 30 minutes.

(17) The PSA sheet according to any of (14) to (16) above, having a water-peel strength FW1 of less than 1 N/cm, determined at a tensile speed of 60 mm/min at a peel angle of 180° without supplying fresh water after the following procedures: the adhesive face of the PSA sheet is applied to an adherend, the resultant is left standing at 23° C. for 30 minutes, one drop of water is dropped onto the adherend, and the water is allowed to enter an interfacial edge between the PSA layer and the adherend.

(18) The PSA sheet according to any of (14) to (17) above, having a normal peel strength FN2 of 7 N/cm or greater, determined at a tensile speed of 60 mm/min at a peel angle of 180° after the adhesive face of the PSA sheet is applied to an adherend and the resultant is left standing at 60° C. for 18 hours.

(19) The PSA sheet according to any of (14) to (18) above, having a water-peel strength FW2 of less than 1 N/cm, determined at a tensile speed of 60 mm/min at a peel angle of 180° without supplying fresh water after the following procedures: the adhesive face of the PSA sheet is applied to an adherend, the resultant is left standing at 60° C. for 18 hours, one drop of water is dropped onto the adherend, and the water is allowed to enter an interfacial edge between the PSA layer and the adherend.

(20) The PSA sheet according to any of (14) to (18) above, having a water-peel strength FW2 of 6 N/cm or greater, determined at a tensile speed of 60 mm/min at a peel angle of 180° without supplying fresh water after the following procedures: the adhesive face of the PSA sheet is applied to an adherend, the resultant is left standing at 60° C. for 18 hours, one drop of water is dropped onto the adherend, and the water is allowed to enter an interfacial edge between the PSA layer and the adherend.

(21) The PSA sheet according to any of (14) to (20) above, having a water-peel adhesive strength reduction rate A of 60% or higher.

(22) The PSA sheet according to any of (14) to (21) above, having a peel strength increase rate of 20% or higher.

(23) The PSA sheet according to any of (14) to (22) above, having a post-heat water-peel adhesive strength reduction rate of 80% or higher.

(24) The PSA sheet according to any of (14) to (23) above, having a haze value lower than 0.7%.

(25) A PSA sheet having a PSA layer,
having a normal peel strength FN1 of 3 N/cm or greater, determined at a tensile speed of 60 mm/min at a peel angle of 180° after the adhesive face of the PSA sheet is applied to an adherend and the resultant is left standing at 23° C. for 30 minutes, having a water-peel adhesive strength reduction rate A of 50% or higher, wherein the water-peel adhesive strength reduction rate A is determined by the next formula $(1-(FW1/FN1))\times 100$ from the normal peel strength FN1 (N/cm) and its water-peel strength FW1 (N/cm) determined at a tensile speed of 60 mm/min at a peel angle of 180°, using a tensile tester based on JIS Z0237 after the following procedures: in an environment at 23° C. and 50% RH, the adhesive face of the PSA sheet is applied to an alkaline glass plate as the adherend; after 30 minutes, 10 µL to 40 µL of distilled water is dropped onto the adherend; and the water is allowed to enter an interfacial edge between the PSA layer and the adherend.

(26) A PSA sheet having a PSA layer, the PSA sheet having an adhesive strength (normal adhesive strength) N0 of 2.0 N/10 mm or greater after one day at room temperature following application of the adhesive face to a surface of an alkaline glass plate as an adherend fabricated by a float method, with the surface of the adherend having a contact angle of 5° to 10° with distilled water, and having a water-peel adhesive strength reduction rate B of 40% or higher, wherein the water-peel adhesive strength reduction rate B is determined by the next formula $(1-(N2/N0))\times 100$ based on the adhesive strength (normal adhesive strength) N0 (N/10 mm) and its water-peel strength N2 (N/10 mm) determined specifically at a test temperature of 23° C. at a tensile speed of 300 mm/min at a peel angle of 180° using a tensile tester according to JIS Z0237:2009 "10.4.1 Method 1: 180° Peel Strength to Test Plate" after the adhesive face is applied to the surface of the alkaline float glass plate adherend having a contact angle of 5° to 10° with distilled water, stored at room temperature for one day, 20 µL of distilled water is dropped onto the adherend and the distilled water is allowed to enter an interfacial edge between the PSA layer and the adherend.

(27) The PSA sheet according to (25) or (26) above, having a normal peel strength FN1 of 3 N/cm or greater, determined at a tensile speed of 60 mm/min at a peel angle of 180° after the adhesive face of the PSA sheet is applied to the adherend and the resultant is left standing at 23° C. for 30 minutes.

(28) The PSA sheet according to any of (25) to (27) above, having a water-peel strength FW1 of less than 1 N/cm, determined at a tensile speed of 60 mm/min at a peel angle of 180° without supplying fresh water after the following procedures: the adhesive face of the PSA sheet is applied to the adherend, the resultant is left standing at 23° C. for 30 minutes, one drop of water is dropped onto the adherend, and the water is allowed to enter an interfacial edge between the PSA layer and the adherend.

(29) The PSA sheet according to any of (25) to (28) above, having a normal peel strength FN2 of 7 N/cm or greater, determined at a tensile speed of 60 mm/min at a peel angle of 180° after the adhesive face of the PSA sheet is applied to the adherend and the resultant is left standing at 60° C. for 18 hours.

(30) The PSA sheet according to any of (25) to (29) above, having a water-peel strength FW2 of less than 1 N/cm, determined at a tensile speed of 60 mm/min at a peel angle of 180° without supplying fresh water after the following procedures: the adhesive face of the PSA sheet is applied to the adherend, the resultant is left standing at 60° C. for 18 hours, one drop of water is dropped onto the adherend, and the water is allowed to enter an interfacial edge between the PSA layer and the adherend.

(31) The PSA sheet according to any of (25) to (29) above, having a water-peel strength FW2 of 6 N/cm or greater, determined at a tensile speed of 60 mm/min at a peel angle of 180° without supplying fresh water after the following procedures: the adhesive face of the PSA sheet is applied to the adherend, the resultant is left standing at 60° C. for 18 hours, one drop of water is dropped onto the adherend, and the water is allowed to enter an interfacial edge between the PSA layer and the adherend.

(32) The PSA sheet according to any of (25) to (31) above, having a water-peel adhesive strength reduction rate A of 60% or higher.

(33) The PSA sheet according to any of (25) to (32) above, having a peel strength increase rate of 20% or higher.

(34) The PSA sheet according to any of (25) to (33) above, having a post-heat water-peel adhesive strength reduction rate of 80% or higher.

(35) The PSA sheet according to any of (25) to (34) above, having a post-heat water-peel adhesive strength reduction rate of 80% or higher.

(36) The PSA sheet according to any of (25) to (35) above, wherein the PSA layer has a thickness of 10 µm or greater and 200 µm or less.

(37) A PSA sheet-bearing optical member comprising the PSA sheet according to any of (14) to (35) above, and an optical member bonded to one face of the PSA sheet.

(38) A method for peeling a PSA sheet adhered on an adherend, the method comprising
a water-peel step in which the PSA sheet is peeled from the adherend, in a state where an aqueous liquid exits at the interface between the adherend and the PSA sheet at the peel front line where the PSA sheet is being peeled from the adherend, with the aqueous liquid allowed to further enter the interface following the movement of the peel front line.

(39) The peel method according to (38) above, wherein the PSA sheet is the PSA sheet according to any of (14) to (36) above.

(40) The peel method according to (38) or (39) above, wherein the peel front line is moved at a speed of 10 mm/min in the water-peel step.

EXAMPLES

Several working examples related to the present invention are described below, but these specific examples are not to limit the present invention. In the description below, "parts" and "%" are by weight unless otherwise specified.

<Test Methods>

[Determination of 23° C.•30 Min Normal Peel Strength]

In a measurement environment at 23° C. and 50% RH, the PSA sheet subject to measurement is cut to a 10 mm wide 120 mm long size to prepare a test piece. In the same environment, the adhesive face of the test piece is press-bonded to the surface of an adherend with a 2 kg roller moved back and force once. The test piece is applied to the adherend so that the peripheral edges of the test piece have distances to the peripheral edges of the adherend of at least 1 mm, preferably at least 3 mm. The resultant is left standing in the same environment for 30 minutes. Subsequently, a cutting knife is inserted into the interface between the test piece and the adherend to separate one end of the length direction of the test piece from the adherend; and based on JIS Z0237, using a tensile tester, the peel strength is determined at a tensile speed of 60 mm/min at a peel angle of 180°. Three measurements are carried out and their average value is used as the 23° C.•30 min normal peel strength (N/cm). As the adherend, an alkaline glass plate (available from Matsunami Glass Ind., Ltd., 1.35 mm thick, blue slide glass with polished edges) is used. Alternatively, a comparable alkaline glass plate available from Matsunami Glass Ind., Ltd., can be used. As the tensile tester, a universal tensile/compression testing machine (machine name "tensile and compression testing machine, TCM-1kNB" available from Minebea Co., Ltd.) or a comparable product can be used. The measurement of peel strength is carried out so that peeling of the test piece adhered to the adherend proceeds upward from the bottom. With respect to the PSA sheet used in an application mode where the PSA layer is partially or fully photocured after applied to an adherend, the test piece is subjected after applied to the adherend to photoirradiation via the alkaline glass plate in an environment at 23° C. and 50% RH. When a double-faced PSA sheet is measured, as described later, PET film is applied to one adhesive face of the double-faced PSA sheet for backing; the measurement can be carried out then.

[Determination of 23° C.•30 Min Water-Peel Strength]

In a measurement environment at 23° C. and 50% RH, the PSA sheet subject to measurement is cut to a 10 mm wide 120 mm long size to prepare a test piece. In the same environment, the adhesive face of the test piece is press-bonded to the surface of the adherend with a 2 kg roller moved back and force once. The resultant is left standing in the same environment for 30 minutes. Subsequently, near one end of the length direction of the test piece, one drop (about 10 µL to about 40 µL) of distilled water is dropped onto the adherend surface exposed off the one end. A cutting knife is then inserted into the interface between the test piece and the adherend to allow the water to enter the interface. After this, without additional supply of water, based on JIS Z0237, using a tensile tester, the peel strength is determined at a tensile speed of 60 mm/min at a peel angle of 180°. Three measurements are carried out and their average value is used as the 23° C.•30 min water-peel strength (N/cm). The adherend, tensile tester and other matters are basically the same as the measurement of 23° C.•30 min normal peel strength.

[Determination of 60° C.•18 h Normal Peel Strength]

In a measurement environment at 23° C. and 50% RH, the PSA sheet subject to measurement is cut to a 10 mm wide 120 mm long size to prepare a test piece. In the same environment, the adhesive face of the test piece is press-bonded to the surface of an adherend with a 2 kg roller moved back and force once. The resultant is left standing in an environment at 60° C. for 18 hours and then in an environment at 23° C. and 50% RH for 30 minutes. Subsequently, a cutting knife is inserted into the interface between the test piece and the adherend to separate one end of the length direction of the test piece from the adherend; and based on JIS Z0237, using a tensile tester, the peel strength is determined at a tensile speed of 60 mm/min at a peel angle of 180°. Three measurements are carried out and their average value is used as the 60° C.•18 h normal peel strength (N/cm). The adherend, tensile tester and other matters are basically the same as the measurement of 23° C.•30 min normal peel strength.

[Determination of 60° C.•18 h Water-Peel Strength]

In a measurement environment at 23° C. and 50% RH, the PSA sheet subject to measurement is cut to a 10 mm wide 120 mm long size to prepare a test piece. In the same environment, the adhesive face of the test piece is press-bonded to the surface of the adherend with a 2 kg roller moved back and force once. The resultant is left standing in an environment at 60° C. for 18 hours and then in an environment at 23° C. and 50% RH for 30 minutes. Subsequently, near one end of the length direction of the test piece, one drop (about 10 µL to about 40 µL) of distilled water is dropped onto the adherend surface exposed off the one end. A cutting knife is then inserted into the interface between the test piece and the adherend to allow the water to enter the interface. After this, without additional supply of water, based on JIS Z0237, using a tensile tester, the peel strength is determined at a tensile speed of 60 mm/min at a peel angle of 180°. Three measurements are carried out and their average value is used as the 60° C.•18 h water-peel strength (N/cm). The adherend, tensile tester and other matters are basically the same as the measurement of 23° C.•30 min normal peel strength.

[Haze Value]

The adhesive face of the PSA layer (the 50 µm thick PSA layer in Examples described later) is applied to one face of an alkaline glass with 0.1% haze to form a laminate of the PSA layer and the alkaline glass. Using a haze meter (MR-100 available from Murakami Color Research Laboratory Co., Ltd.), the laminate's haze value is measured. For the measurement, the alkaline glass bearing the PSA sheet is arranged so that the PSA layer is on the light source side. As the haze value of the alkaline glass is 0.1%, 0.1% is subtracted from the measurement value to determine the haze value (%) of the PSA layer.

[Normal Adhesive Strength N0]

A PSA sheet subject to measurement is cut to a 10 mm wide 120 mm long rectangular shape to prepare a test piece. The adhesive face of the test piece is adhered to an adherend with a hand-held roller to obtain a test sample. The test sample is placed in an autoclave and treated at a pressure of 5 atm and a temperature of 50° C. for 15 minutes.

The test sample is removed from the autoclave and stored in an environment at 23° C. and 50% RH for one day. Subsequently, in the same environment, a cutting knife is inserted into the interface between the test piece and the adherend to separate one end of the length direction of the test piece from the adherend; and the peel strength is determined according to "10.4.1 Method 1: 180° Peel Strength to Test Plate" in JIS Z0237:2009," in particular, using a tensile tester at a test temperature of 23° C., a tensile speed of 300 mm/min and a peel angle of 180°.

[Water-Peel Strength N2]

A PSA sheet subject to measurement is cut to a 10 mm wide 120 mm long rectangular shape to prepare a test piece. The adhesive face of the test piece is adhered to an adherend with a hand-held roller to obtain a test sample. The test sample is placed in an autoclave and treated at a pressure of 5 atm and a temperature of 50° C. for 15 minutes.

The test sample is removed from the autoclave and stored in an environment at 23° C. and 50% RH for one day. Subsequently, in the same environment, near one end of the length direction of the test piece, 20 µL of distilled water is dropped onto the adherend surface exposed off the one end. A cutting knife is then inserted into the interface between the test piece and the adherend to allow the water to enter the interface. After this, the peel strength is determined according to "10.4.1 Method 1: 180° Peel Strength to Test Plate"

in JIS Z0237:2009," in particular, using a tensile tester at a test temperature of 23° C., a tensile speed of 300 mm/min and a peel angle of 180°. It is noted that the water used in measurement of water-peel strength N2 is only the 20 µL of distilled water dropped onto the adherend before the start of peeling.

In the measurement of normal adhesive strength N0 and water-peel strength N2, the adherend used is an alkaline glass plate fabricated by a float method with a surface (to which the test piece is adhered) having a contact angle of 5° to 10° with distilled water. For instance, as the adherend, an alkaline glass plate (1.35 mm thick, blue slide glass with polished edges) available from Matsunami Glass Ind., Ltd., or a comparable product can be used. The test piece is adhered to the adherend so that the distance from a peripheral edge of the test piece to a peripheral edge of the adherend is at least 10 mm or greater, or preferably 15 mm or greater. In the PSA sheet including a photo-crosslinkable PSA layer, the sample removed from the autoclave is subjected via the alkaline glass plate to photoirradiation in an environment at 23° C. and 50% RH and the peel strength is determined after this. Photoirradiation conditions (wavelength, intensity of radiation, irradiation time, etc.) are suitably selected (e.g. the conditions described later) in accordance with the PSA layer's composition, thickness, etc. As the tensile tester, a universal tensile/compression testing machine (machine name "tensile and compression testing machine, TCM-1kNB" available from Minebea Co., Ltd.) or a comparable product can be used. The measurement of peel strength is carried out so that peeling of the test piece adhered to the adherend proceeds upward from the bottom. For the measurement, a suitable backing material can be applied to the backside (the reverse side of the adhesive face to be measured) as necessary to reinforce the test piece. As the backing material, for example, an about 25 µm thick polyethylene terephthalate film can be used.

The contact angle of the alkaline glass plate is determined as follows: In an environment at 23° C. and 50% RH (measurement atmosphere), measurement is carried by a drop method, using a contact angle meter (available from Kyowa Interface Science Co., Ltd.; product name DMo-501, control box DMC-2, control/analysis software FAMAS (version 5.0.30)). The amount of distilled water dropped is 2 µL. From an image taken at 5 seconds after distilled water is dropped, the contact angle is determined by the Θ/2 method (conducted 5 times).

Other particulars related to the measurement of normal adhesive strength N0 and water-peel strength N2 are basically equivalent to the measurement of 23° C.•30 min normal peel strength. Likewise, for matters not described regarding the measurement of 23° C.•30 min normal peel strength, suitable reference shall be made to the description of the methods for determining normal adhesive strength N0 and water-peel strength N2.

Example 1

(Preparation of PSA Composition)

Into a reaction vessel equipped with a condenser, nitrogen inlet, thermometer and stirrer, were placed 64.5 parts of n-butyl acrylate (BA), 6 parts of cyclohexyl acrylate (CHA), 9.6 parts of N-vinyl-2-pyrrolidone (NVP), 5 parts of isostearyl acrylate (iSTA), 14.9 parts of 4-hydroxybutyl acrylate (4HBA), 0.07 part of α-thioglycerol as chain transfer agent and 122 parts of ethyl acetate as polymerization solvent. To this, was added 0.2 part of 2,2'-azobisisobutylonitrile (AIBN). Under a nitrogen atmosphere, solution polymerization was carried out to obtain a solution containing an acrylic polymer of Mw $60 \times 10^4$.

To the resulting solution, per 100 parts of the monomers used for preparing the solution, were added 0.33 part of 3-glycidoxipropyltrimethoxysilane (product name KBM-403 available from Shin-Etsu Chemical Co., Ltd.) as silane coupling agent, 0.1 part of nonionic surfactant A (polyoxyethylene sorbitan monolaurate, HLB 13.3, product name RHEODOL TW-L106 available from Kao Corporation) as the compound A, 0.09 part (non-volatiles) of isocyanate-based crosslinking agent (trimethylolpropane/xylylene diisocyanate adduct; TAKENATE D-110N available from Mitsui Chemicals, Inc.; 75% NV by mass), 0.4 part of acrylic oligomer, 0.02 part of dioctyltin dilaurate (EMBILIZER OL-1 available from Tokyo Fine Chemical Co., Ltd.) as crosslinking catalyst, 3 parts of acetylacetone as crosslinking retarder, 2.7 parts of dipentaerythritol hexaacrylate (DPHA) as polyfunctional monomer, and 0.22 part of IRGACURE 184 (available from Ciba Specialty Chemicals, Inc.) as photopolymerization initiator; and uniformly mixed to prepare a solvent-based PSA composition.

The acrylic oligomer used above was synthesized by the method shown below.

[Synthesis of Acrylic Oligomer]

Into a 4-necked flask, were placed 100 parts of toluene, 60 parts of dicyclopentanyl methacrylate (DCPMA) (product name FA-513M available from Hitachi Chemical Co., Ltd.), 40 parts of methyl methacrylate (MMA) and 3.5 parts of α-thioglycerol as chain transfer agent. Under a nitrogen atmosphere, the reaction mixture was allowed to stir at 70° C. for one hour and 0.2 part of AIBN was added as thermal polymerization initiator. The reaction was carried out at 70° C. for 2 hours and then at 80° C. for 2 hours. Subsequently, the reaction mixture was placed under an atmosphere at a temperature of 130° C. to dry and remove toluene, chain transfer agent and unreacted monomers, whereby an acrylic oligomer in a solid state was obtained. This acrylic oligomer had a Tg of 144° C. and a Mw of 4300.

(Preparation of PSA Sheet)

To a 38 µm thick release film R1 (MRF #38 available from Mitsubishi Plastics, Inc.) having a release face on one side of polyester film, the resulting PSA composition was applied and allowed to dry at 135° C. for 2 minutes to form a 50 µm thick PSA layer. To the PSA layer, was adhered a 50 µm thick corona-treated PET film to obtain a laminate sheet with the PET film (backing film), the PSA layer (supportless adhesively double-faced PSA sheet) and release film R1 layered in this order. The adhesive face to be adhered to the adherend in the PSA sheet of this Example is protected with release film R1.

Example 2

As the compound A, in place of nonionic surfactant A, was used nonionic surfactant B (polyoxyethylene sorbitan monooleate, HLB 10.0, product name RHEODOL TW-O106V available from Kao Corporation). Otherwise, in the same manner as Example 1, a PSA composition was prepared and a PSA sheet according to this Example was obtained.

Example 3

As the compound A, in place of nonionic surfactant A, was used nonionic surfactant C (polyoxyethylene lauryl ether, HLB 9.7, product name EMALGEN 105 available from Kao Corporation). Otherwise, in the same manner as Example 1, a PSA composition was prepared and a PSA sheet according to this Example was obtained.

Example 4

As the compound A, in place of nonionic surfactant A, was used nonionic surfactant D (sorbitan monolaurate, HLB 8.6, product name RHEODOL SP-L10 available from Kao Corporation). Otherwise, in the same manner as Example 1, a PSA composition was prepared and a PSA sheet according to this Example was obtained.

Example 5

As the compound A, in place of nonionic surfactant A, was used nonionic surfactant E (sorbitan monooleate, HLB 4.3, product name RHEODOL SP-O10V available from Kao Corporation). Otherwise, in the same manner as Example 1, a PSA composition was prepared and a PSA sheet according to this Example was obtained.

Example 6

As the compound A, in place of nonionic surfactant A, was used an anionic surfactant (sodium lauryl sulfate, product name EMAL 10G available from Kao Corporation). Otherwise, in the same manner as Example 1, a PSA composition was prepared and a PSA sheet according to this Example was obtained.

Example 7

As the compound A, in place of 0.1 part of nonionic surfactant A, was used 0.05 part of nonionic surfactant F (polyoxyethylene lauryl ether, HLB 12.1, product name EMALGEN 108 available from Kao Corporation). Otherwise, in the same manner as Example 1, a PSA composition was prepared and a PSA sheet according to this Example was obtained.

Example 8

The amount of nonionic surfactant A used was changed to 2 parts per 100 parts of monomers. Otherwise in the same manner as Example 1, a PSA composition was prepared and a PSA sheet according to this Example was obtained.

Example 9

The amount of nonionic surfactant D used was changed to 2 parts per 100 parts of monomers. Otherwise in the same manner as Example 4, a PSA composition was prepared and a PSA sheet according to this Example was obtained.

Example 10

No compound A was used. Otherwise in the same manner as Example 1, a PSA composition was prepared and a PSA sheet according to this Example was obtained.

Example 11

(Preparation of PSA Composition)

Into a 4-necked flask, were placed 100 parts of a monomer mixture containing 2-ethylhexyl acrylate (2EHA), NVP, hydroxyethyl acrylate (HEA) and isobornyl acrylate (IBXA) at a weight ratio of 80/35/5/30 along with 0.05 part of product name IRGACURE 651 (available from Ciba Specialty Chemicals, Inc.) and 0.05 part of product name IRGACURE 184 (available from Ciba Specialty Chemicals, Inc.) as photopolymerization initiators. Under a nitrogen atmosphere, the reaction mixture was irradiated with UV rays and photopolymerization was carried out to a viscosity of about 15 Pa·s (BH viscometer, No. 5 rotor, 10 rpm, measurement temperature 30° C.) to prepare a monomer syrup containing a partial polymer of the monomer mixture.

To 100 parts of the monomer syrup, was added 0.15 part of nonionic surfactant G (polyoxyethylene sorbitan monolaurate, HLB 16.7, product name RHEODOL TW-L120 available from Kao Corporation) as the compound A and were further added and uniformly mixed 0.13 part of 1,6-hexanediol diacrylate (HDDA) and 0.33 part of photopolymerization initiator (product name IRGACURE 651 available from Ciba Specialty Chemicals, Inc.) to prepare a UV ray-curable PSA composition.

To a 38 μm thick release film R1 (MRF #38 available from Mitsubishi Plastics, Inc.) having a release face on one side of polyester film, the resulting PSA composition was applied and covered with a 38 μm thick release film R2 (MRE #38 available from Mitsubishi Plastics, Inc.) having a release face on one side of polyester film to block air. The resultant was allowed to cure by UV irradiation to form a 50 μm thick PSA layer. Subsequently, release film R2 covering the PSA layer was removed and the exposed surface was adhered to a 50 μm thick PET film to obtain a laminate sheet with the PET film (backing film), the PSA layer (supportless adhesively double-faced PSA sheet) and release film R1 layered in this order. The adhesive face to be adhered to the adherend in the PSA sheet of this Example is protected with release film R1.

Example 12 to Example 14

The amount of nonionic surfactant G used per 100 parts of the monomer syrup was changed to 0.25 part (Example 12), 0.5 part (Example 13) or 1.0 part (Example 14) per 100 parts of the monomer syrup. Otherwise in the same manner as Example 11, each PSA composition according to each Example was prepared and a PSA sheet according to each Example was obtained.

Example 15

As the compound A, in place of nonionic surfactant G, was used PEG 400 (polyethylene glycol, average molecular weight 360 to 440). Otherwise in the same manner as Example 12, a PSA composition was prepared and a PSA sheet according to this Example was obtained.

Example 16 and Example 17

The amount of PEG 400 used was changed to 0.5 part (Example 16) or 1.0 part (Example 17) per 100 parts of the monomer syrup. Otherwise in the same manner as Example 15, each PSA composition according to each Example was prepared and a PSA sheet according to each Example was obtained.

Example 18

No compound A was used. Otherwise in the same manner as Example 11, a PSA composition was prepared and a PSA sheet according to this Example was obtained.

Example 19

To the acrylic polymer-containing solution prepared by the same method as Example 1, per 100 parts of the monomers used for preparing the solution, were added 0.1 part of nonionic surfactant G (polyoxyethylene sorbitan monolaurate, HLB 16.7, product name RHEODOL TW-L120 available from Kao Corporation) as the compound A, 0.09 part (non-volatiles) of isocyanate-based crosslinking agent (trimethylolpropane/xylylene diisocyanate adduct; TAKENATE D-110N available from Mitsui Chemicals, Inc.; 75% NV by mass), 0.4 part of acrylic oligomer (the same one as the acrylic oligomer used in Example 1), 0.02 part of dioctyltin dilaurate (EMBILIZER OL-1 available from Tokyo Fine Chemical Co., Ltd.) as crosslinking catalyst, 3 parts of acetylacetone as crosslinking retarder, 2.7 parts of DPHA as polyfunctional monomer, and 0.22 part of IRGACURE 184 (available from Ciba Specialty Chemicals, Inc.) as photopolymerization initiator; and uniformly mixed to prepare a solvent-based PSA composition.

Using the solvent-based PSA composition, but otherwise in the same manner as Example 1, was obtained a laminate sheet with a PET film (backing film), a 50 µm thick PSA layer (supportless adhesively double-faced PSA sheet) and release film R1 layered in this order.

Example 20

The amount of nonionic surfactant G used was changed to 0.3 part per 100 parts of monomers. Otherwise in the same manner as Example 19, a PSA composition was prepared and a PSA sheet according to this Example was obtained.

Example 21

As the compound A, in place of nonionic surfactant G, was used nonionic surfactant H (polyoxyethylene lauryl ether, HLB 15.3, product name EMALGEN 120 Kao Corporation). Otherwise in the same manner as Example 20, a PSA composition was prepared and a PSA sheet according to this Example was obtained.

Example 22

(Preparation of PSA Composition)

Into a reaction vessel equipped with a condenser, nitrogen inlet, thermometer and stirrer, were placed 64.5 parts of BA, 6 parts of CHA, 18 parts of NVP, 5 parts of iSTA and 14.9 parts of 4HBA as monomers, 0.07 part of α-thioglycerol as chain transfer agent and 122 parts of ethyl acetate as polymerization solvent. To this, was added 0.2 part of AIBN as thermal polymerization initiator. Under a nitrogen atmosphere, solution polymerization was carried out to obtain a solution containing an acrylic polymer of Mw $60 \times 10^4$.

To the resulting solution, per 100 parts of the monomers used for preparing the solution, were added 0.1 part of nonionic surfactant G (polyoxyethylene sorbitan monolaurate, HLB 16.7, product name RHEODOL TW-L120 available from Kao Corporation), 0.09 part (non-volatiles) of isocyanate-based crosslinking agent (trimethylolpropane/ xylylene diisocyanate adduct; TAKENATE D-110N available from Mitsui Chemicals, Inc.; 75% NV by mass), 0.4 part of acrylic oligomer (the same one as the acrylic oligomer used in Example 1), 0.02 part of dioctyltin dilaurate (EMBILIZER OL-1 available from Tokyo Fine Chemical Co., Ltd.) as crosslinking catalyst, 3 parts of acetylacetone as crosslinking retarder, 2.7 parts of dipentaerythritol hexaacrylate (DPHA) as polyfunctional monomer, and 0.22 part of IRGACURE 184 (available from Ciba Specialty Chemicals, Inc.) as photopolymerization initiator; and uniformly mixed to prepare a PSA composition.

Using the solvent-based PSA composition, but otherwise in the same manner as Example 1, was obtained a laminate sheet with a PET film (backing film), a 50 µm thick PSA layer (supportless adhesively double-faced PSA sheet) and release film R1 layered in this order.

Example 23

The amount of nonionic surfactant G used was changed to 0.3 part per 100 parts of monomers. Otherwise in the same manner as Example 22, a PSA composition was prepared and a PSA sheet according to this Example was obtained.

Example 24

Into a 4-necked flask, were placed 100 parts of a monomer mixture containing BA, CHA and 4HBA at a weight ratio of 70/13/18 along with 0.05 part of product name IRGACURE 651 (available from Ciba Specialty Chemicals, Inc.) and 0.05 part of product name IRGACURE 184 (available from Ciba Specialty Chemicals, Inc.) as photopolymerization initiators. Under a nitrogen atmosphere, the reaction mixture was irradiated with UV rays and photopolymerization was carried out to a viscosity of about 15 Pa s (BH viscometer, No. 5 rotor, 10 rpm, measurement temperature 30° C.) to prepare a monomer syrup containing a partial polymer of the monomer mixture. To 100 parts of the monomer syrup, were added and uniformly mixed 9 parts of HEA and 8 parts of 4HBA, 0.1 part of DPHA as polyfunctional monomer, and 0.1 part of nonionic surfactant G (polyoxyethylene sorbitan monolaurate, HLB 16.7, product name RHEODOL TW-L120 available from Kao Corporation) to prepare a UV ray-curable PSA composition.

Using the UV ray-curable PSA composition, but otherwise in the same manner as Example 11, was obtained a laminate sheet with a PET film (backing film), a 50 µm thick PSA layer (supportless adhesively double-faced PSA sheet) and release film R1 layered in this order.

Example 25 to Example 26

The amount of nonionic surfactant G used was changed to 0.3 part (Example 25) or 0.5 part (Example 26) per 100 parts of the monomer syrup. Otherwise in the same manner as Example 24, a PSA composition according to each Example was prepared and a PSA sheet according to this Example was obtained.

<Evaluations of Properties>

The resulting PSA sheets were subjected to measurements of normal adhesive strength (N/cm) and water-peel strength (N/cm) after 30 minutes at 23° C. as well as normal adhesive strength (N/cm) and water-peel strength (N/cm) after 18 hours at 60° C. The results are shown in Tables 1 to 4. In Tables 3 and 4, to identify the differences in basic composition from the solvent-based PSA according to Examples 1 to 10, the solvent-based PSA according to Examples 19 to 21 are indicated as "Solvent-based B" and the solvent-based PSA according to Examples 22 to 23 as "Solvent-based C" (in relation to this, the solvent-based PSA according to Examples 1 to 10 may be referred to as "Solvent-based A"). Likewise, to identify the differences in basic composition from the photocurable PSA according to Examples 11 to 18, the photocurable PSA according to Examples 24 to 26 is indicated as "Photocurable type B" (in relation to this, the photocurable PSA according to Examples 11 to 18 may be referred to as "Photocurable type A").

The resulting PSA sheets were subjected to measurements of normal adhesive strength N0 (N/10 mm) and water-peel strength N2 (N/10 mm).

With respect to Examples 1 to 23, all peel strength measurements were carried out by the methods described earlier after the PSA sheet was applied to an alkaline glass plate (adherend) by the method described earlier and was subjected to light irradiation via the alkaline glass plate in an environment at 23° C. and 50% RH. In particular, after the PSA sheets were applied to the adherend, using a high-pressure mercury lamp (300 mW/cm$^2$), UV light irradiation was carried out to a cumulative dose of 3000 mJ/cm$^2$ to photocure the PSA layers in the PSA sheets according to Examples 1 to 23. Subsequently, peel strength measurements were carried out. With respect to Examples 24 to 26, peel strength measurements were carried out without the light irradiation after the application.

TABLE 1

| | | Compound A | | | 23° C. · 30 min peel strength (N/cm) | | 60° C. · 18 h peel strength (N/cm) | | Haze value |
| | PSA | Species | HLB | parts | Normal peel strength | Water-peel strength | Normal peel strength | Water-peel strength | (%) |
|---|---|---|---|---|---|---|---|---|---|
| Ex. 1 | Solvent-based | Nonionic surfactant A | 13.3 | 0.1 | 4.3 | 0.9 | 8.3 | 7.0 | 0.4 |
| Ex. 2 | | Nonionic surfactant B | 10.0 | 0.1 | 4.3 | 0.9 | 8.3 | 6.9 | 0.4 |
| Ex. 3 | | Nonionic surfactant C | 9.7 | 0.1 | 3.9 | 1.2 | 8.1 | 7.0 | 0.4 |
| Ex. 4 | | Nonionic surfactant D | 8.6 | 0.1 | 4.2 | 1.2 | 8.4 | 7.0 | 0.4 |
| Ex. 5 | | Nonionic surfactant E | 4.3 | 0.1 | 4.2 | 1.2 | 8.3 | 6.9 | 0.4 |
| Ex. 6 | | Anionic surfactant | — | 0.1 | 4.1 | 1.0 | 9.2 | 7.7 | 0.7 |
| Ex. 7 | | Nonionic surfactant F | 12.1 | 0.05 | 4.1 | 0.9 | 7.8 | 6.9 | 0.4 |
| Ex. 8 | | Nonionic surfactant A | 13.3 | 2.0 | 1.7 | 0.1 | 7.3 | 6.1 | 1.1 |
| Ex. 9 | | Nonionic surfactant D | 8.6 | 2.0 | 2.4 | 0.3 | 8.1 | 6.1 | 0.9 |
| Ex. 10 | | — | — | — | 4.2 | 1.4 | 8.4 | 7.2 | 0.4 |

TABLE 2

| | | Compound A | | | 23° C. · 30 min peel strength (N/cm) | | 60° C. · 18 h peel strength (N/cm) | | Haze value |
| | PSA | Species | HLB | parts | Normal peel strength | Water-peel strength | Normal peel strength | Water-peel strength | (%) |
|---|---|---|---|---|---|---|---|---|---|
| Ex. 11 | Photocurable type | Nonionic surfactant G | 16.7 | 0.15 | 14.0 | 0.1 | 15.0 | 0.1 | 0.4 |
| Ex. 12 | | | | 0.25 | 11.1 | 0.0 | 14.6 | 0.1 | 0.4 |
| Ex. 13 | | | | 0.5 | 7.4 | 0.0 | 12.0 | 0.0 | 0.5 |
| Ex. 14 | | | | 1.0 | 3.1 | 0.0 | 4.1 | 0.0 | 0.5 |
| Ex. 15 | | PEG400 | — | 0.25 | 14.2 | 0.5 | 16.1 | 0.5 | 0.4 |
| Ex. 16 | | | | 0.5 | 12.0 | 0.1 | 14.6 | 0.1 | 0.5 |
| Ex. 17 | | | | 1.0 | 3.3 | 0.0 | 4.5 | 0.0 | 0.5 |
| Ex. 18 | | — | — | — | 14.6 | 3.7 | 15.9 | 3.7 | 0.4 |

TABLE 3

| | | Compound A | | | 23° C. · 30 min peel strength (N/cm) | | 60° C. · 18 h peel strength (N/cm) | | Haze value |
| | PSA | Species | HLB | parts | Normal peel strength | Water-peel strength | Normal peel strength | Water-peel strength | (%) |
|---|---|---|---|---|---|---|---|---|---|
| Ex. 19 | Solvent-based B | Nonionic surfactant G | 16.7 | 0.1 | 5.4 | 0.1 | 6.1 | 0.5 | 0.3 |
| Ex. 20 | | Nonionic surfactant G | 16.7 | 0.3 | 5.0 | 0.1 | 6.0 | 0.3 | 0.3 |
| Ex. 21 | | Nonionic surfactant H | 15.3 | 0.3 | 6.2 | 0.4 | 6.5 | 0.6 | 0.3 |
| Ex. 22 | Solvent-based C | Nonionic surfactant G | 16.7 | 0.1 | 10.5 | 0.3 | 11.5 | 0.7 | 0.3 |
| Ex. 23 | | Nonionic surfactant G | 16.7 | 0.3 | 10.2 | 0.2 | 11.2 | 0.5 | 0.3 |

TABLE 4

| | | Compound A | | | 23° C. · 30 min peel strength (N/cm) | | 60° C. · 18 h peel strength (N/cm) | | Haze value |
|---|---|---|---|---|---|---|---|---|---|
| | | | | | Normal peel | Water-peel | Normal peel | Water-peel | |
| | PSA | Species | HLB | parts | strength | strength | strength | strength | (%) |
| Ex. 24 | Photocurable | Nonionic surfactant G | 16.7 | 0.1 | 5.5 | 0.7 | 6.1 | 0.8 | 0.4 |
| Ex. 25 | type B | Nonionic surfactant G | 16.7 | 0.3 | 4.9 | 0.6 | 5.5 | 0.7 | 0.4 |
| Ex. 26 | | Nonionic surfactant G | 16.7 | 0.5 | 4.5 | 0.5 | 4.8 | 0.5 | 0.4 |

As shown in Table 1, in Example 10 using a solvent-based PSA free of at least one species of compound A selected among surfactants and polyoxyalkylene backbone-containing compounds, the 23° C.•30 min water-peel strength was 1.4 N/cm; however, in Examples 1 to 9 using compound A-containing solvent-based PSAs, the 23° C.•30 min water-peel strength was lower than 1.3 N/cm. Improvement of water-peel strength was observed when the compound A was included. In particular, in Examples 1, 2 and 7 using nonionic surfactants A, B and F, respectively, as the compound A, excellent results were obtained with 23° C.•30 min water-peel strength values below 1.0 N/cm. These results are presumably due to the relatively high HLB values (specifically, HLB 10 or higher) of these nonionic surfactants. Examples 1 to 7 had good adhesive strength with the 23° C.•30 min normal peel strength at or above 4 N/cm. On the other hand, with respect to Examples 8 and 9 for which the amount of compound A was increased to 2 parts, the normal peel strength decreased while the water-peel strength tended to decrease. In Examples 8 and 9, the haze value tended to increase as well. In Examples 1 to 10, with the inclusion of peel strength enhancer, the normal peel strength increased significantly (by at least about 2-fold) after 18 hours at 60° C. relative to that after 30 minutes at 23° C.

Superior water-peeling properties were observed in the photocurable PSAs shown in Table 2. In particular, in Examples 11 to 17 using photocurable PSAs that use compounds A, the 23° C.•30 min water-peel strength was less than 1.0 N/cm, showing superior water-peeling properties to Example 18 (water-peel strength 3.7 N/cm) not using a compound A. Examples 11 to 13 and 15 to 16 using less than 1 part of compound A had good adhesive strength with the 23° C.•30 min normal peel strength at or above 4 N/cm. On the other hand, in Examples 14 and 17 for which the amount of compound A was increased to 1 part, the normal peel strength decreased (below 4 N/cm). In these photocurable types, the normal peel strength increased after 18 hours at 60° C. than that after 30 minutes at 23° C.; however, with respect to the water-peel strength, the ease of peeling after 18 hours at 60° C. was still comparable to that after 30 minutes at 23° C.

As shown in Table 3, in Examples 19 to 23 using solvent-based PSAs that included compounds A having high HLB, superior water-peeling properties were observed. In these Examples, the 23° C.•30 min normal peel strength tended to be higher than Examples 1 to 9. In these Examples using no peel strength enhancer, the increase in normal peel strength after 18 hours at 60° C. was suppressed, whereby excellent water-peeling properties were maintained even after 18 hours at 60° C. In particular, Examples 22 to 23 showed high normal peel strength after 30 minutes at 23° C. as well as after 18 hours at 60° C. while maintaining water-peeling properties. As shown in Table 4, Examples 24 to 26 using photocurable PSAs also had good normal peel strength along with excellent water-peeling properties. In these Examples, peel strength enhancer was used, either; and the increase in normal peel strength after 18 hours at 60° C. was suppressed while good water-peeling properties were displayed even after 18 hours at 60° C.

While not shown in Tables, the PSA sheets according to Examples 1 to 9, 11 to 17 and 19 to 26 had normal peel strength N0 of 2.0 N/10 mm or greater while satisfying the water-peel adhesive strength reduction rate B of 40% or higher. The value of water-peel adhesive strength reduction rate B was determined from the water-peel strength N2 (N/10 mm) and the normal adhesive strength N0 (N/10 mm) by the next equation (1−(N2/N0))×100. In the Examples, for both the normal peel strength and water-peel strength, the measurement values (normal adhesive strength N0 and water-peel strength N2) at a tensile speed of 300 mm/min are higher than the measurement values (normal peel strength and water-peel strength after 30 minutes at 23° C.) at a tensile speed of 60 mm/min. This trend is general in PSAs.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 2 PSA sheets
10 PSA layer
10A first surface (adhesive face)
10B second surface
20 support
20A first face
20B second face (backside)
30, 31, 32 release liners
50 release-linered PSA sheet
70 optical member
100 PSA sheet-bearing member

The invention claimed is:
1. An optical pressure-sensitive adhesive composition consisting of a solvent-based pressure-sensitive adhesive composition, an active energy ray-curable pressure-sensitive adhesive composition, or a hot-melt pressure-sensitive adhesive composition, the pressure-sensitive adhesive composition comprising:
  an acrylic polymer; and
  at least one species of compound A selected among surfactants and compounds having polyoxyalkylene backbones, wherein
  the acrylic polymer is formed from monomers,
  the monomers do not comprise an alkoxyalkyl (meth) acrylate, or comprise the alkoxyalkyl (meth)acrylate in an amount less than 20% by weight,
  the monomers are essentially free of an alkoxypolyalkylene glycol (meth)acrylate; and the compound A has a hydrophile-lipophile balance (HLB) of 14 or higher.

2. The pressure-sensitive adhesive composition according to claim 1, wherein the pressure-sensitive adhesive composition is the solvent-based pressure-sensitive adhesive composition.

3. The pressure-sensitive adhesive composition according to claim 1, wherein the compound A is a nonionic surfactant.

4. The pressure-sensitive adhesive composition according to claim 1, wherein the monomers forming the acrylic polymer comprise
an alkyl (meth)acrylate having an alkyl group with 1 to 20 carbon atoms at its ester terminus, and
a monomer having a nitrogen atom (N).

5. The pressure-sensitive adhesive composition according to claim 4, wherein the N-containing monomer is one, two or more species of monomers selected from the group consisting of cyclic N-vinyl amides represented by a general formula (1) and (meth)acrylamides:

[Chem 1]

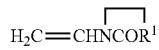
(1)

(in the general formula (1), $R^1$ is a divalent organic group).

6. The pressure-sensitive adhesive composition according to claim 1, wherein the acrylic polymer has a solubility parameter (SP) value of 18.0 $(MJ/m^3)^{1/2}$ to 23.0 $(MJ/m^3)^{1/2}$.

7. The pressure-sensitive adhesive composition according to claim 1, further comprising a peel strength enhancer.

8. The pressure-sensitive adhesive composition according to claim 7, wherein the peel strength enhancer is a compound having an alkoxysilyl group.

9. An optical pressure-sensitive adhesive composition consisting of a solvent-based pressure-sensitive adhesive composition, an active energy ray-curable pressure-sensitive adhesive composition, or a hot-melt pressure-sensitive adhesive composition, the pressure-sensitive adhesive composition comprising:
an acrylic polymer, wherein the acrylic polymer has a solubility parameter (SP) value of 18.0 $(MJ/m^3)^{1/2}$ to 23.0 $(MJ/m^3)^{1/2}$; and
at least one species of compound A selected among surfactants and polyoxyalkylene backbone-containing compounds, wherein
the compound A is included in an amount of less than 1 part by weight to 100 parts by weight of the acrylic polymer.

10. The pressure-sensitive adhesive composition according to claim 9, wherein the compound A has an HLB of 10 or higher.

11. An optical pressure-sensitive adhesive sheet having a pressure-sensitive adhesive layer formed from the pressure-sensitive adhesive composition according to claim 1.

12. The pressure-sensitive adhesive sheet according to claim 11, wherein the pressure-sensitive adhesive layer has a thickness of 10 μm or greater and 200 μm or less.

13. A pressure-sensitive adhesive sheet-bearing optical member comprising the pressure-sensitive adhesive sheet according to claim 11, and an optical member bonded to one face of the pressure-sensitive adhesive sheet.

14. A method for peeling the pressure-sensitive adhesive sheet according to claim 11 that is adhered on an adherend, the method including
a water-peel step in which the pressure-sensitive adhesive sheet is peeled from the adherend, in a state where an aqueous liquid exits at the interface between the adherend and the pressure-sensitive adhesive sheet at the front line of peeling the pressure-sensitive adhesive sheet from the adherend, with the aqueous liquid allowed to further enter the interface following the movement of the peel front line.

15. An optical pressure-sensitive adhesive sheet having a pressure-sensitive adhesive layer formed from the pressure-sensitive adhesive composition according to claim 2.

16. The pressure-sensitive adhesive sheet according to claim 15, wherein the pressure-sensitive adhesive layer has a thickness of 10 μm or greater and 200 μm or less.

17. A pressure-sensitive adhesive sheet-bearing optical member comprising the pressure-sensitive adhesive sheet according to claim 15, and an optical member bonded to one face of the pressure-sensitive adhesive sheet.

18. A method for peeling the pressure-sensitive adhesive sheet according to claim 15 that is adhered on an adherend, the method comprising
a water-peel step in which the pressure-sensitive adhesive sheet is peeled from the adherend, in a state where an aqueous liquid exits at the interface between the adherend and the pressure-sensitive adhesive sheet at the front line of peeling the pressure-sensitive adhesive sheet from the adherend, with the aqueous liquid allowed to further enter the interface following the movement of the peel front line.

19. A pressure-sensitive adhesive sheet having a pressure-sensitive adhesive layer, the pressure-sensitive adhesive sheet
having a normal peel strength FN1 of 2 N/cm or greater, determined at a tensile speed of 60 mm/min at a peel angle of 180° after an adhesive face of the pressure-sensitive adhesive sheet is applied to an alkaline glass plate as an adherend and the resultant is left standing at 23° C. for 30 minutes; and
having a water-peel adhesive strength reduction rate A of 50% or higher, wherein the water-peel adhesive strength reduction rate A is determined by the next formula (1−(FW1/FN1))×100 from the normal peel strength FN1 (N/cm) and its water-peel strength FW1 (N/cm) determined at a tensile speed of 60 mm/min at a peel angle of 180°, using a tensile tester based on JIS Z0237 after the following procedures: in an environment at 23° C. and 50% RH, the adhesive face of the pressure-sensitive adhesive sheet is applied to an alkaline glass plate as an adherend; after 30 minutes, 10 μL to 40 μL of distilled water is dropped onto the adherend; and the water is allowed to enter an interfacial edge between the pressure-sensitive adhesive layer and the adherend,
wherein the pressure-sensitive adhesive layer is formed from an optical pressure-sensitive adhesive composition (A) or an optical pressure-sensitive adhesive composition (B),
the optical pressure-sensitive adhesive composition (A) consists of a solvent-based pressure-sensitive adhesive composition, an active energy ray-curable pressure-sensitive adhesive composition, or a hot-melt pressure-sensitive adhesive composition, the optical pressure-sensitive adhesive composition (A) comprises:

an acrylic polymer (a); and at least one species of compound A selected among surfactants and compounds having polyoxyalkylene backbones, the acrylic polymer (a) is formed from monomers (a), the monomers (a) do not comprise an alkoxyalkyl (meth)acrylate, or comprise the alkoxyalkyl (meth)acrylate in an amount less than 20% by weight, the monomers (a) are essentially free of an alkoxypolyalkylene glycol (meth)acrylate;

the compound A has a hydrophile-lipophile balance (HLB) of 14 or higher, the optical pressure-sensitive adhesive composition (B) consists of a solvent-based pressure-sensitive adhesive composition, an active energy ray-curable pressure-sensitive adhesive composition, or a hot-melt pressure-sensitive adhesive composition, the optical pressure-sensitive adhesive composition (B) comprises:

an acrylic polymer (b), wherein the acrylic polymer (b) has a solubility parameter (SP) value of 18.0 $(MJ/m^3)^{1/2}$ to 23.0 $(MJ/m^3)^{1/2}$; and at least one species of compound A selected among surfactants and polyoxyalkylene backbone-containing compounds, wherein the compound A is comprised in an amount of less than 1 part by weight to 100 parts by weight of the acrylic polymer.

* * * * *